(12) United States Patent
Ke

(10) Patent No.: US 12,069,768 B2
(45) Date of Patent: Aug. 20, 2024

(54) TERMINAL CAPABILITY IDENTIFIER OPERATION METHOD AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 460 days.

(21) Appl. No.: 17/392,358

(22) Filed: Aug. 3, 2021

(65) Prior Publication Data
US 2021/0368333 A1 Nov. 25, 2021

Related U.S. Application Data

(63) Continuation of application No. PCT/CN2020/074201, filed on Feb. 3, 2020.

(30) Foreign Application Priority Data

Feb. 3, 2019 (CN) .......................... 201910108736.3

(51) Int. Cl.
*H04W 8/24* (2009.01)
*H04W 60/04* (2009.01)
*H04W 60/06* (2009.01)

(52) U.S. Cl.
CPC .............. *H04W 8/24* (2013.01); *H04W 60/04* (2013.01); *H04W 60/06* (2013.01)

(58) Field of Classification Search
CPC ....... H04W 60/06; H04W 60/04; H04W 8/24; H04W 8/22; H04W 60/00
See application file for complete search history.

(56) References Cited

U.S. PATENT DOCUMENTS

2005/0021536 A1* 1/2005 Fiedler .................. G06Q 10/06
2012/0284702 A1* 11/2012 Ganapathy .......... G06F 21/6218
726/17

(Continued)

FOREIGN PATENT DOCUMENTS

| CN | 103891344 A | 6/2014 |
|---|---|---|
| CN | 107404717 A | 11/2017 |
| WO | 2012152076 A1 | 11/2012 |

OTHER PUBLICATIONS

Ericsson, "KI#1—Definition separation of PLMN assigned and manufacturer assigned UE Capability ID", 3GPP TSG-SA WG2 Meeting #130, S2-1901037, Kochi, India, Jan. 21-25, 2019.

(Continued)

*Primary Examiner* — Congvan Tran
(74) *Attorney, Agent, or Firm* — Price Heneveld, LLP

(57) ABSTRACT

Embodiments of this disclosure provide a terminal capability identifier operation method and a communications device. The operation method includes: performing a first operation related to terminal capability identifier, where the first operation related to terminal capability identifier includes at least one of the following: deleting or suspending a terminal capability identifier; changing a first-type terminal capability identifier in a terminal context to a second-type terminal capability identifier; or transmitting operation information of terminal capability identifier.

19 Claims, 9 Drawing Sheets

(56) References Cited

U.S. PATENT DOCUMENTS

| | | | |
|---|---|---|---|
| 2014/0098756 A1* | 4/2014 | Tabatabaei Yazdi | ........................ H04W 74/006 370/328 |
| 2015/0208456 A1* | 7/2015 | Guo | ...................... H04W 36/03 455/552.1 |
| 2015/0312787 A1 | 10/2015 | Das et al. | |
| 2015/0334583 A1* | 11/2015 | Feng | ................... H04L 65/1083 370/338 |
| 2016/0226732 A1* | 8/2016 | Kim | ........................ H04W 4/70 |
| 2016/0262055 A1* | 9/2016 | Liao | ........................ H04L 69/22 |
| 2017/0285621 A1 | 10/2017 | Pradas et al. | |

OTHER PUBLICATIONS

Ericsson, "KI#3—Co-existence and priority order between PLMN assigned and manufacturer assigned UE Capability ID", 3GPP TSG-SA WG2 Meeting #130, S2-1900107, Kochi (India), Jan. 21-25, 2019.

Ericsson, "PLMN assigned ID with distributed database", 3GPP SA WG2 Meeting #130, S2-1900110, Kechi, In, Jan. 21-25, 2019.

"3rd Generation Partnership Project; Technical Specification Group Services and System Aspects; Study on optimisations of UE radio capability signalling (Release 16)", 3GPP TR 23.743 V1.0.0 (Dec. 2018), Valbonne, France.

* cited by examiner

ТERMINAL CAPABILITY IDENTIFIER OPERATION METHOD AND COMMUNICATIONS DEVICE

CROSS-REFERENCE TO RELATED APPLICATIONS

This application is a continuation application of PCT Application No. PCT/CN2020/074201 filed on Feb. 3, 2020, which claims priority to Chinese Patent Application No. 201910108736.3, filed in China on Feb. 3, 2019, the disclosures of which are incorporated herein by reference in their entireties.

TECHNICAL FIELD

Embodiments of this disclosure relate to the field of wireless communication technologies, and in particular, to a terminal capability identifier operation method and a communications device.

BACKGROUND

With evolution of networks, a terminal needs to support an increasing quantity of capabilities, so the terminal also needs to report an increasing quantity of capabilities to the network. Capability reporting in turn increases air interface load.

In order to reduce overheads resulting from terminal capability reporting, identifiers of terminal capabilities may be set for the terminal. The identifier of terminal capability (which may be referred to as terminal capability identifier for short) may be used to identify a terminal capability set. There is a mapping relationship between the terminal capability identifier and the terminal capability set, and the terminal capability set may be obtained through mapping the terminal capability identifier. A size of related information of a terminal capability identifier is smaller than that of a terminal capability, thereby achieving an effect of reducing capability signaling.

The related information of terminal capability identifier may be allocated by the network or allocated by a terminal manufacturer. One terminal capability set may have both related information of a terminal capability identifier allocated by the network and related information of a terminal capability identifier allocated by a terminal manufacturer.

Because the terminal may have related information of a plurality of terminal capability identifiers, how to effectively manage the related information of the terminal capability identifiers is a technical problem that needs to be resolved in the related art.

SUMMARY

According to a first aspect, an embodiment of this disclosure provides a terminal capability identifier operation method, applied to a first communications device and including:
performing a first operation related to terminal capability identifier, where the first operation related to terminal capability identifier includes at least one of the following:
deleting or suspending a terminal capability identifier;
changing a first-type terminal capability identifier in a terminal context to a second-type terminal capability identifier; or
transmitting operation information of terminal capability identifier.

According to a second aspect, an embodiment of this disclosure provides a terminal capability identifier operation method, applied to a second communications device and including:
receiving operation information of terminal capability identifier, where the operation information of terminal capability identifier includes at least one of the following:
indication information indicating deleting or suspending a terminal capability identifier;
a terminal capability identifier requested to be deleted or suspended;
first indication information, where the first indication information indicates changing a first-type terminal capability identifier in a terminal context to a second-type terminal capability identifier;
second indication information, where the second indication information indicates transmitting a second-type terminal capability identifier when a terminal capability identifier needs to be transmitted;
network identification information, where the network is an updated network to which a terminal capability identifier is applicable;
network identification information, where the network is a newly-added network to which a terminal capability identifier is applicable; or
network identification information, where the network is a network to which a terminal capability identifier is not applicable; and
performing a second operation related to terminal capability identifier based on the operation information of terminal capability identifier.

According to a third aspect, an embodiment of this disclosure provides a terminal capability identifier operation method, applied to a third communications device and including:
transmitting all terminal capability identifiers mapped to current capabilities of a terminal; where
the current capabilities of the terminal are a terminal capability set of the terminal in a first network; and
the terminal capability identifier includes at least one of the following: network-related terminal capability identifier or terminal-manufacturer-related terminal capability identifier.

According to a fourth aspect, an embodiment of this disclosure provides a terminal capability identifier operation method, applied to a fourth communications device and including:
if a second condition is met, transmitting request information, where the request information includes at least one of the following: type information of terminal capability identifier, first request information, request information for a terminal-manufacturer-related terminal capability identifier, or enquiry information about whether a terminal-manufacturer-related terminal capability identifier is present; where
the type information of terminal capability identifier is used for obtaining a terminal capability identifier conforming to the type information;
the first request information is used to request all types of terminal capability identifiers, and the terminal capability identifier is a terminal capability identifier mapped to a current capability of a terminal; and
the second condition includes that no terminal-manufacturer-related terminal capability identifier is present.

According to a fifth aspect, an embodiment of this disclosure provides a terminal capability identifier operation method, applied to a fifth communications device and including:

receiving request information, where the request information includes at least one of the following: type information of terminal capability identifier, first request information, request information for a terminal-manufacturer-related terminal capability identifier, or enquiry information about whether a terminal-manufacturer-related terminal capability identifier is present, where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and transmitting related information of terminal capability identifier based on the request information.

According to a sixth aspect, an embodiment of this disclosure provides a communications device, including:

an execution module, configured to perform a first operation related to terminal capability identifier, where the first operation related to terminal capability identifier includes at least one of the following:

deleting or suspending a terminal capability identifier;

changing a first-type terminal capability identifier in a terminal context to a second-type terminal capability identifier; or transmitting operation information of terminal capability identifier.

According to a seventh aspect, an embodiment of this disclosure provides a communications device, including:

a first receiving module, configured to receive operation information of terminal capability identifier, where the operation information of terminal capability identifier includes at least one of the following:

indication information indicating deleting or suspending a terminal capability identifier;

a terminal capability identifier requested to be deleted or suspended;

first indication information, where the first indication information indicates changing a first-type terminal capability identifier in a terminal context to a second-type terminal capability identifier;

second indication information, where the second indication information indicates transmitting a second-type terminal capability identifier when a terminal capability identifier needs to be transmitted;

network identification information, where the network is an updated network to which a terminal capability identifier is applicable;

network identification information, where the network is a newly-added network to which a terminal capability identifier is applicable; or network identification information, where the network is a network to which a terminal capability identifier is not applicable; and an execution module, configured to perform a second operation related to terminal capability identifier based on the operation information of terminal capability identifier.

According to an eighth aspect, an embodiment of this disclosure provides a communications device, including:

a transmitting module, configured to transmit all terminal capability identifiers mapped to current capabilities of a terminal; where the current capabilities of the terminal are a terminal capability set of the terminal in a first network; and the terminal capability identifier includes at least one of the following: a network-related terminal capability identifier type or a terminal-manufacturer-related terminal capability identifier type.

According to a ninth aspect, an embodiment of this disclosure provides a communications device, including:

a transmitting module, configured to: if a second condition is met, transmit request information, where the request information includes at least one of the following: type information of terminal capability identifier, first request information, request information for a terminal-manufacturer-related terminal capability identifier, or enquiry information about whether a terminal-manufacturer-related terminal capability identifier is present; where the type information of terminal capability identifier is used for obtaining a terminal capability identifier conforming to the type information;

the first request information is used to request all types of terminal capability identifiers, and the terminal capability identifier is a terminal capability identifier mapped to a current capability of a terminal; and the second condition includes that no terminal-manufacturer-related terminal capability identifier is present.

According to a tenth aspect, an embodiment of this disclosure provides a communications device, including:

a receiving module, configured to receive request information, where the request information includes at least one of the following: type information of terminal capability identifier, first request information, request information for a terminal-manufacturer-related terminal capability identifier, or enquiry information about whether a terminal-manufacturer-related terminal capability identifier is present, where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and a transmitting module, configured to transmit related information of terminal capability identifier based on the request information.

According to an eleventh aspect, an embodiment of this disclosure provides a communications device, including a processor, a memory, and a computer program stored in the memory and capable of running on the processor. When the computer program is executed by the processor, the steps of the operation method for the terminal capability identifier described above are implemented.

According to a twelfth aspect, an embodiment of this disclosure provides a computer-readable storage medium, where a program is stored in the computer-readable storage medium, and when the computer program is executed by a processor, the steps of the operation method for the terminal capability identifier described above are implemented.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the accompanying drawings.

DESCRIPTION OF EMBODIMENTS

Figure 1:
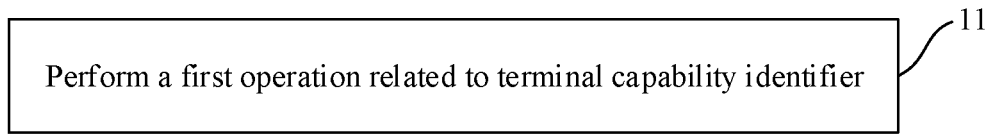
FIG. 1 is a schematic flowchart of a terminal capability identifier operation method according to embodiment 1 of this disclosure.

The following clearly and completely describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted to be more optional or advantageous than other embodiments or design solutions. To be precise, the words such as "an example" or "for example" are intended to present a related concept in a specific manner.

Techniques described in this specification are not limited to a 5th generation (5G) system and a later evolved communications system, and also are not limited to a Long Term Evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system can implement radio technologies such as CDMA2000 and Universal Terrestrial Radio Access (UTRA). The UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies.

For better understanding the embodiments of this disclosure, the following technical points are first described.

1. Terminal Capabilities

First, it should be noted that capabilities of the terminal may be classified into radio capabilities and core network capabilities. For the radio capability, the terminal may report the radio capability of the terminal based on a request of the network. For the core network capability, the terminal may report the network capability of the terminal during registration. The terminal can support a plurality of bands and frequencies. With the introduction of technologies such as carrier aggregation (CA) and dual connectivity (DC), various possible band combinations need to be arranged, and band combinations supported by various terminal manufacturers may be different, resulting in an extremely large quantity of radio capabilities. In addition, with evolution of the networks, an increasing quantity of features is introduced into the network, and different radio capabilities and network capabilities are usually required for different features. For a related network feature, the terminal needs to inform the network of information about whether the feature is supported.

2. Related Information of Terminal Capability Identifier

In order to reduce overheads resulting from terminal capability reporting, identifiers of terminal capabilities may be set for the terminal. The identifier of terminal capability (which may be referred to as terminal capability identifier for short) may be used to identify a terminal capability set. There is a mapping relationship between the terminal capability identifier and the terminal capability set, and a terminal capability set may be obtained through mapping a terminal capability identifier. A method for terminal capability signaling optimization is that the terminal reports, to the network, only related information of an identifier indicating the terminal capability set. The network may obtain the terminal capability set through mapping the related information of the terminal capability identifier. A size of related information of a terminal capability identifier is smaller than that of a terminal capability, thereby achieving an effect of reducing capability signaling. The function may be referred to terminal capability optimization.

The related information of terminal capability identifier may be allocated by the network or allocated by a terminal manufacturer.

In a manner of allocating the related information of terminal capability identifier by the terminal manufacturer, the terminal merely needs to report, to the network, the related information of a terminal capability identifier allocated by the terminal manufacturer. In a manner of allocating the related information of terminal capability identifier by the network, the terminal needs to report a terminal capability set to the network, and the network then transmits, to the terminal, related information of terminal capability identifier obtained through mapping the terminal capability set. Therefore, the two manners correspond to different network behavior, and also correspond to different network capabilities.

One terminal capability set may have both a terminal capability identifier allocated by the network and a terminal capability identifier allocated by the terminal manufacturer, only a terminal capability identifier allocated by the network, only a terminal capability identifier allocated by the terminal manufacturer, or no terminal capability identifier.

The terminal capability identifier allocated by the terminal manufacturer may be referred to as a terminal-manufacturer-related terminal capability identifier. The terminal capability identifier allocated by the network may be referred to as a network-related terminal capability identifier.

In order to support terminal capability signaling optimization, the following problems needs to be resolved:

Problem 1: When the terminal provides the network with related information of a terminal-manufacturer-related terminal capability identifier, the network may have no mapping relationship between the related information of the terminal-manufacturer-related terminal capability identifier and a terminal capability set. In this case, the network may obtain a terminal capability of the terminal, and then provides the terminal with related information of the network-related terminal capability identifier. The terminal and the network may subsequently obtain the terminal capability set through mapping the related information of the network-related terminal capability identifier. Next, the network may obtain the mapping relationship between the related information of the terminal-manufacturer-related terminal capability identifier and the terminal capability set from a background server of the terminal manufacturer, and the network may want the terminal to use the related information of the terminal-manufacturer-related terminal capability identifier. However, it is still unclear about how to fall back from related information of a network-related terminal capability identifier to the related information of the terminal-manufacturer-related terminal capability identifier.

Problem 2: The related information of a network-related terminal capability identifier may be applicable to a plurality of public land mobile networks (PLMN). When a PLMN is no longer applicable, it is still unclear about whether to add a new applicable PLMN or to update an applicable PLMN.

It should be noted that, in the embodiments of this disclosure, obtaining may be understood as acquiring from configuration, reception, obtaining through reception upon a request, obtaining through self-learning, obtaining through deduction based on non-received information, or obtaining through processing received information, which may be determined according to actual needs. This is not limited in the embodiments of this disclosure. For example, when one specific piece of capability indication information is not received from a device, it can be deduced that the device does not support that capability.

It should be noted that, in the embodiments of this disclosure, transmitting may include broadcasting, broadcasting through a system message, or returning a response after receiving a request.

In an optional embodiment of this disclosure, the communications network element may be one of the following: a physical device, a network function, and a network element.

Optionally, one terminal may have related information of one or more terminal capability identifiers.

In an optional embodiment of this disclosure, the terminal capability, terminal capability information, and terminal capability set may mean the same.

In an optional embodiment of this disclosure, "related information of capability identifier", "related information of terminal capability identifier", and "related information of an identifier of terminal capability" may mean the same.

In an optional embodiment of this disclosure, a network-related terminal capability identifier may also be referred to as a terminal capability identifier allocated by the network.

In an optional embodiment of this disclosure, a terminal-manufacturer-related terminal capability identifier may also be referred to as a terminal capability identifier allocated by the terminal manufacturer.

In an optional embodiment of this disclosure, the terminal capability identifier may be understood as a current terminal capability identifier. The current terminal capability identifier may be understood as at least one of the following: related information of a terminal capability identifier corresponding to a current terminal capability set, related information of a valid terminal capability identifier, a latest terminal capability identifier, a latest terminal capability identifier transmitted by the terminal to the network, or a latest terminal capability identifier allocated by the network.

In an optional embodiment of this disclosure, the network is a network that provides access for terminals, may be a network or a dedicated network of a network operator (such as an operator), or may be a public communications network or a private communications network. In an optional embodiment of this disclosure, the wireless communications network may be at least one of the following: a public network or a non-public network. Optionally, a network identifier of the network may be one of the following: a public network identifier (such as a PLMN ID) and a non-public network identifier (such as a non-public network (NPN) ID and/or a PLMN ID used for a non-public network).

In an optional embodiment of this disclosure, the non-public network is an abbreviation of the non-public network. The non-public network may be referred to as one of the following: a non-public communications network. The non-public network may include at least one of the following deployment manners: a physical non-public network, a virtual non-public network, or a non-public network implemented on a public network. In an implementation, the non-public network is a closed access group (CAG). A CAG may include a group of terminals.

In an optional embodiment of this disclosure, the non-public network may include or be referred to as a private network. The private network may be referred to as one of the following: a private communications network, a private network, a local area network (LAN), a private virtual private network (PVPN), an isolated communications network, a dedicated communications network, or other names. It should be noted that the naming manner is not specifically limited in the embodiments of this disclosure.

In an optional embodiment of this disclosure, the public network is an abbreviation of the public network. The public network may be referred to as one of the following: a public communications network or other names. It should be noted that the naming manner is not specifically limited in the embodiments of this disclosure.

In an optional embodiment of this disclosure, the communications device may include at least one of the following: a communications network element or a terminal.

In an optional embodiment of this disclosure, the communications network element may include at least one of the following: a core network element or a radio access network element.

In the embodiments of this disclosure, a core-network element (CN network element) may include but is not limited to at least one of the following: a core network device, a core network node, a core network function, a core-network element, a mobility management entity (MME), an access mobility management function (AMF), a session management function (SMF), a user plane function (UPF), a serving gateway (SGW), a packet data network gateway (PDN-GW), a policy control function (PCF), a policy and charging rules function unit (PCRF), a general packet radio service (GPRS) serving support node (SGSN), a gateway GPRS support node (GGSN), or a radio access network device.

In the embodiments of this disclosure, a radio access network (RAN) network element may include but is not limited to at least one of the following: a radio access network device, a radio access network node, a radio access network function, a radio access network unit, a 3GPP radio access network, a non-3GPP radio access network, a centralized unit (CU), a distributed unit (DU), a base station, an evolved Node B (eNB), a 5G base station (gNB), a radio network controller (RNC), a base station (NodeB), a non-3GPP interworking function (N3IWF), an access controller (AC) node, an access point (AP) device, a wireless local area network (WLAN) node, or an N3IWF.

The base station may be a base transceiver station (BTS) in a Global System for Mobile Communications (GSM) or Code Division Multiple Access (CDMA) network, may be a base station (NodeB) in WCDMA, or may be an evolved NodeB (eNB or eNodeB) in LTE, or a 5G NodeB (gNB). This is not limited in the embodiments of this disclosure.

In the embodiments of this disclosure, the UE is a terminal. The terminal may include a relay that supports a terminal function, or a terminal that supports a relay function. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal is not limited in the embodiments of this disclosure.

Referring to FIG. 1, FIG. 1 is a terminal capability identifier operation method according to Embodiment 1 of this disclosure, applied to a first communications device. The first communications device includes but is not limited to one of the following: a first communications network element (such as a CN network element of a first network, or a RAN network element of the first network). The operation method includes:

Step 11: Perform a first operation related to terminal capability identifier, where the first operation related to terminal capability identifier includes at least one of the following:

(1) Deleting or suspending a terminal capability identifier

To be specific, the first communications device deletes or suspends the terminal capability identifier from a terminal context stored in the first communications device. For example, when the first communications device has both a network-related terminal capability identifier of the terminal and a terminal-manufacturer-related capability identifier of the terminal, the network-related terminal capability identifier may be deleted or suspended, and the terminal-manufacturer-related capability identifier may be used to communicate with other communications devices.

(2) Changing a first-type terminal capability identifier in a terminal context to a second-type terminal capability identifier Optionally, the first type is a network-related terminal capability identifier type and the second type is a terminal-manufacturer-related terminal capability identifier type; or the first type is a terminal-manufacturer-related terminal capability identifier type and the second type is a network-related terminal capability identifier type.

(3) Transmitting operation information of terminal capability identifier

To be specific, the first communications device transmits the operation information of terminal capability identifier to other communications devices. The other communications device are, for example, a terminal or a RAN network element of the first network.

In this embodiment of this disclosure, the first communications device performs an operation related to terminal capability identifier to manage the terminal capability identifier, so that the network and the terminal are consistent in use of the terminal capability identifier.

In an implementation, the first communications device that performs the first operation related to terminal capability identifier is a core network element.

In an implementation, the first communications device that performs the first operation related to terminal capability identifier is a radio access network element.

In an implementation, the operation information of terminal capability identifier includes at least one of the following:

(1) Indication information indicating deleting or suspending a terminal capability identifier.

In an implementation, the first communications device indicates another communications device to delete or suspend the terminal capability identifier. The terminal capability identifier may be a network-related terminal capability identifier.

(2) Terminal capability identifier requested to be deleted or suspended.

In an implementation, when a part of a plurality of terminal capability identifiers of the terminal need to be deleted or suspended, the terminal capability identifiers requested to be deleted or suspended may be transmitted. The terminal capability identifier may be a network-related terminal capability identifier.

(3) First indication information, where the first indication information indicates changing a first-type terminal capability identifier in a terminal context to a second-type terminal capability identifier.

(4) Second indication information, where the second indication information indicates transmitting a second-type terminal capability identifier when a terminal capability identifier needs to be transmitted.

(5) Network identification information, where the network is an updated network to which a terminal capability identifier is applicable.

For example, network identification information of a network to which a terminal capability identifier of the terminal is applicable includes: network identifier 1 and network identifier 2. The network identification information transmitted by the first communications device includes: network identifier 3 and network identifier 4, where the network is an updated network to which a terminal capability identifier is applicable. In this case, the terminal may update, based on the received network identification information, the network identification information of the network to which the terminal capability identifier is applicable to include network identifier 3 and network identifier 4.

(6) Network identification information, where the network is a newly-added network to which a terminal capability identifier is applicable.

For example, network identification information of a network to which a terminal capability identifier of the terminal is applicable includes: network identifier 1 and network identifier 2. The network identification information transmitted by the first communications device includes: network identifier 3, where the network is a newly-added network to which the terminal capability identifier is applicable. In this case, the terminal may modify, based on the received network identification information, the network identification information of the network to which the terminal capability identifier is applicable. The modified network identification information of the network to which the terminal capability identifier is applicable includes: network identifier 1, network identifier 2, and network identifier 3.

(7) Network identification information, where the network is a network to which a terminal capability identifier is not applicable.

For example, network identification information of a network to which a terminal capability identifier of the terminal is applicable includes: network identifier 1 and network identifier 2. The network identification information transmitted by the first communications device includes: network identifier 2, where the network is a network to which the terminal capability identifier is not applicable. In this case, the terminal may modify, based on the received network identification information, the network identification information of the network to which the terminal capability identifier is applicable. The modified network identification information of the network to which the terminal capability identifier is applicable includes: network identifier 1.

In an implementation, the network may be a public network, and the network identifier is a PLMN identifier.

In another implementation, the network may be a non-public network, and the network identifier may be one of the following: a PLMN ID (for example, a PLMN identifier with an MNC of 999) and an NPN identifier, a PLMN identifier and a CSG identifier, and an NPN identifier.

In an implementation, the first type is a network-related terminal capability identifier type and the second type is a terminal-manufacturer-related terminal capability identifier type.

In an implementation, the terminal capability identifier is a network-related terminal capability identifier. That is, the performing the first operation related to terminal capability identifier includes: performing a first operation related to network-related terminal capability identifier.

In an implementation, when a first condition is met, the first operation related to terminal capability identifier is performed; and the first condition includes at least one of the following:

(1) the network-related terminal capability identifier has been configured for the terminal;

(2) a terminal capability set mapped to a terminal-manufacturer-related terminal capability identifier is obtained;

(3) a mapping relationship between a terminal-manufacturer-related terminal capability identifier and a terminal capability set is obtained, and the terminal capability set is consistent with a current capability of the terminal; or (4) a terminal-manufacturer-related terminal capability identifier mapped to a current capability of the terminal is obtained.

The current capability of the terminal is a terminal capability set of the terminal in a first network.

In an implementation, the first communications device obtains and stores related information of the terminal-manufacturer-related terminal capability identifier, but has no terminal capability set mapped to the related information of the terminal-manufacturer-related terminal capability identifier; and therefore allocates the network-related terminal capability identifier to the terminal. However, the terminal capability set mapped to the related information of the terminal-manufacturer-related terminal capability identifier is obtained later. In this case, the first communications device already knows that the terminal has the related information of the terminal-manufacturer-related terminal capability identifier, and may request the terminal to delete or suspend the network-related terminal capability identifier. When the terminal needs to report the terminal capability identifier, the terminal reports the related information of the terminal-manufacturer-related terminal capability identifier.

In another implementation, the first communications device does not obtain the related information of the terminal-manufacturer-related terminal capability identifier, and allocates the network-related terminal capability identifier to the terminal. However, a terminal-manufacturer-related terminal capability identifier mapped to a current capability of the terminal is obtained later. In this case, the first communications device does not know whether the terminal has the related information of the terminal-manufacturer-related terminal capability identifier. After determining that the terminal has the related information of the terminal-manufacturer-related terminal capability identifier, the first communications device may request the terminal to delete or suspend the network-related terminal capability identifier. When the terminal needs to report the terminal capability identifier, the terminal reports the related information of the terminal-manufacturer-related terminal capability identifier.

In an implementation, if the operation information of terminal capability identifier includes at least one of the following: indication information indicating suspending a terminal capability identifier or a terminal capability identifier requested to be suspended;

after the transmitting the operation information of terminal capability identifier, the following is further included: transmitting restoring operation information of terminal capability identifier, where the restoring operation information of terminal capability identifier is used for restoring a suspended terminal capability identifier.

The restoring operation information of terminal capability identifier includes at least one of the following: indication information indicating restoring a terminal capability identifier or a terminal capability identifier requested to be restored.

In an implementation, before the performing the first operation related to terminal capability identifier, the method further includes:

if a second condition is met, transmitting request information, where the request information includes at least one of the following:
 (1) type information of the terminal capability identifier, where the type information is used for obtaining a terminal capability identifier conforming to the type information;
 (2) first request information, where the first request information is used to request all types of terminal capability identifiers, and the terminal capability identifier is a terminal capability identifier mapped to a current capability of a terminal;
 (3) request information for a terminal-manufacturer-related terminal capability identifier; or
 (4) enquiry information about whether terminal-manufacturer-related terminal capability identifier is present.

The second condition includes that no terminal-manufacturer-related terminal capability identifier is present.

In an implementation, the terminal capability identifier is a terminal capability identifier mapped to a current capability of a terminal, and the current capability of the terminal is a terminal capability set of the terminal in a first network.

In an implementation, the type of terminal capability identifier includes at least one of the following: a terminal-manufacturer-related terminal capability identifier type or a network-related terminal capability identifier type.

In this embodiment of this disclosure, the first communications device performs the operation related to terminal capability identifier to manage the terminal capability identifier, so that the network and the terminal are consistent in use of the terminal capability identifier.

Figure 2:
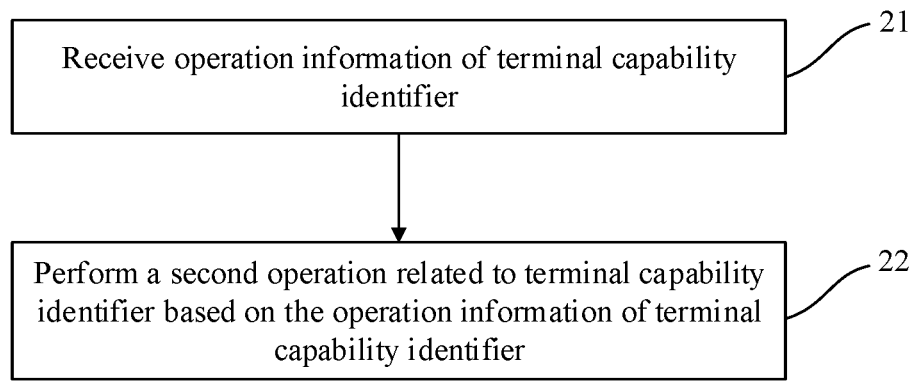
FIG. 2 is a schematic flowchart of a terminal capability identifier operation method according to embodiment 2 of this disclosure.

Referring to FIG. 2, FIG. 2 is a terminal capability identifier operation method according to Embodiment 2 of this disclosure, applied to a second communications device. The second communications device includes but is not limited to one of the following: a terminal and a second communications network element (such as a RAN network element of a first network or a CN network element of the first network). The operation method includes the following steps.

Step 21: Receive operation information of terminal capability identifier, where the operation information of terminal capability identifier includes at least one of the following:
 indication information indicating deleting or suspending a terminal capability identifier;
 a terminal capability identifier requested to be deleted or suspended;
 first indication information, where the first indication information indicates changing a first-type terminal capability identifier in a terminal context to a second-type terminal capability identifier;
 second indication information, where the second indication information indicates transmitting a second-type terminal capability identifier when a terminal capability identifier needs to be transmitted;
 network identification information where the network is an updated network to which a terminal capability identifier is applicable;
 network identification information where the network is a newly-added network to which a terminal capability identifier is applicable; or
 network identification information, where the network is a network to which a terminal capability identifier is not applicable.

Step 22: Perform a second operation related to terminal capability identifier based on the operation information of terminal capability identifier.

In an implementation, the terminal capability identifier is a network-related terminal capability identifier. To be specific, the receiving operation information of terminal capability identifier includes: receiving operation information of network-related terminal capability identifier. The performing a second operation related to terminal capability identifier based on the operation information of terminal capability identifier includes: performing a second operation related to network-related terminal capability identifier based on the operation information of network-related terminal capability identifier.

In an implementation, the performing a second operation related to terminal capability identifier based on the operation information of terminal capability identifier includes:
 if a third condition is met, performing the second operation related to terminal capability identifier based on the operation information of terminal capability identifier.

The third condition includes at least one of the following:
 the terminal enters an idle state;
 the terminal enters a connected state again after being in an idle state;
 the terminal is detached from a first network;
 the terminal is deregistered from a first network;
 the terminal initially registers with a first network; or the terminal is initially attached to a first network.

In one embodiment, when the third condition is met, the second operation related to terminal capability identifier is performed based on the operation information of terminal capability identifier, instead of performing the second operation related to terminal capability identifier immediately after the operation information of terminal capability identifier is received. In other words, the operation information of terminal capability identifier is delayed to take effect, instead of taking effect immediately.

Certainly, in some other embodiments of this disclosure, alternatively, the second operation related to terminal capability identifier may be performed immediately after the operation information of terminal capability identifier is received. It is not difficult to understand that from the perspective of the core network element of the first network, the terminal has provided the network-related terminal capability identifier during initial registration, and the core network element obtains a terminal capability set through mapping the network-related terminal capability identifier. The core network element has the terminal capability set of the terminal, and the core network element always stores a terminal context unless the terminal is detached. The terminal needs to report the terminal capability identifier only when the terminal is initially attached to a first network. In this case, if the terminal has deleted or suspended the network-related terminal capability identifier based on the received operation information of terminal capability identifier, the terminal reports related information of the terminal-manufacturer-related terminal capability identifier.

It is not difficult to understand that from the perspective of the radio access network element of the first network, after the terminal enters the idle state, the core network element no longer stores the terminal context. Therefore, the terminal needs to report the terminal capability identifier again only when the terminal enters the connected state again. In this case, if the terminal has deleted or suspended the network-related terminal capability identifier based on the received operation information of terminal capability identifier, the terminal reports related information of the terminal-manufacturer-related terminal capability identifier.

In an implementation, if the operation information of terminal capability identifier includes a terminal capability identifier requested to be deleted or suspended, the performing a second operation related to terminal capability identifier based on the operation information of terminal capability identifier includes: deleting or suspending the terminal capability identifier that is indicated by the operation information of terminal capability identifier.

In an implementation, if the operation information of terminal capability identifier includes first indication information, the performing a second operation related to terminal capability identifier based on the operation information of terminal capability identifier includes: changing a first-type terminal capability identifier in a terminal context to a second-type terminal capability identifier.

In an implementation, if the operation information of terminal capability identifier includes second indication information, the performing a second operation related to terminal capability identifier based on the operation information of terminal capability identifier includes: transmitting a second-type terminal capability identifier when a terminal capability identifier needs to be transmitted.

In an implementation, the performing a second operation related to terminal capability identifier based on the operation information of terminal capability identifier includes at least one of the following:
  performing a corresponding operation on a network-related terminal capability identifier based on the operation information of terminal capability identifier;
  performing a corresponding operation on a terminal-manufacturer-related terminal capability identifier based on the operation information of terminal capability identifier;
  transmitting a terminal-manufacturer-related terminal capability identifier;
  transmitting a second-type terminal capability identifier; or
  updating a network to which a network-related terminal capability identifier is applicable.

In an implementation, if the operation information of terminal capability identifier includes indication information indicating deleting or suspending a terminal capability identifier,
  the performing a corresponding operation on a network-related terminal capability identifier based on the operation information of terminal capability identifier includes at least one of the following: deleting or suspending a network-related terminal capability identifier, or deleting or suspending related information of a network to which a network-related terminal capability identifier is applicable.

Optionally, when a network-related terminal capability identifier is present, the network-related terminal capability identifier is deleted or suspended, and/or related information of a network to which the network-related terminal capability identifier is applicable is deleted or suspended. When a plurality of network-related terminal capability identifiers are present, all network-related terminal capability identifiers are deleted or suspended, and/or related information of a network to which all the network-related terminal capability identifier are applicable is deleted or suspended.

In an implementation, if the operation information of terminal capability identifier includes: network identification information, where the network is an updated network to which a terminal capability identifier is applicable,
  the performing a corresponding operation on a network-related terminal capability identifier based on the operation information of terminal capability identifier includes: updating, based on the network identification information, the network to which the network-related terminal capability identifier is applicable.

In an implementation, if the operation information of terminal capability identifier includes: network identification information, where the network is a newly-added network to which the terminal capability identifier is applicable,
  the performing a corresponding operation on a network-related terminal capability identifier based on the operation information of terminal capability identifier includes: adding the network identification information to networks to which the network-related terminal capability identifier is applicable.

In an implementation, if the operation information of terminal capability identifier includes: network identification information, where the network is a network to which the terminal capability identifier is not applicable,
  the performing a corresponding operation on a network-related terminal capability identifier based on the operation information of terminal capability identifier includes: deleting the network identification information from networks to which the network-related terminal capability identifier is applicable.

In an implementation, after the receiving operation information of terminal capability identifier, the following is further included: receiving restoring operation information of terminal capability identifier, where the restoring operation information of terminal capability identifier is used for restoring a suspended terminal capability identifier; and
  the restoring operation information of terminal capability identifier includes at least one of the following: indication information indicating restoring a terminal capability identifier or a terminal capability identifier requested to be restored.

In an implementation, before the receiving operation information of terminal capability identifier, the following is further included:
  receiving request information, where the request information includes at least one of the following:
  type information of terminal capability identifier, first request information, request information for a terminal-manufacturer-related terminal capability identifier, or enquiry information about whether a terminal-manufacturer-related terminal capability identifier is present; where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and transmitting related information of the terminal capability identifier based on the request information.

In an implementation, the terminal capability identifier is a terminal capability identifier mapped to a current capability of the terminal; and the current capability of the terminal is a terminal capability set of the terminal in a first network.

In an implementation, the type of terminal capability identifier includes at least one of the following: a terminal-manufacturer-related terminal capability identifier type or a network-related terminal capability identifier type.

In an implementation, if the request information includes type information of terminal capability identifier, the related information of terminal capability identifier includes: a terminal capability identifier conforming to the type information.

In an implementation, if the request information includes request information for a terminal-manufacturer-related terminal capability identifier, the related information of terminal capability identifier includes at least one of the following: a terminal-manufacturer-related terminal capability identifier, indication information that a terminal-manufacturer-related terminal capability identifier is present, or indication information that no terminal-manufacturer-related terminal capability identifier is present.

In an implementation, if the request information includes enquiry information about whether a terminal-manufacturer-related terminal capability identifier is present, the related information of terminal capability identifier includes: indication information that a terminal-manufacturer-related terminal capability identifier is present, or indication information that no terminal-manufacturer-related terminal capability identifier is present.

In an implementation, if the request information includes first request information, the related information of terminal capability identifier includes: all types of terminal capability identifiers corresponding to the current capability of the terminal.

In this embodiment of this disclosure, the second communications device performs the operation related to terminal capability identifier based on the operation information of terminal capability identifier transmitted by the network side, to manage the terminal capability identifier, so that the network and the terminal are consistent in use of the terminal capability identifier.

Figure 3:
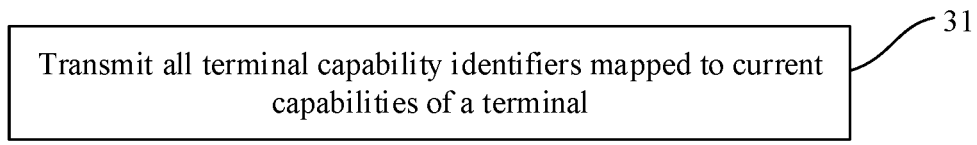
FIG. 3 is a schematic flowchart of a terminal capability identifier operation method according to embodiment 3 of this disclosure.

Referring to FIG. 3, FIG. 3 is a terminal capability identifier operation method according to Embodiment 3 of this disclosure, applied to a third communications device. The third communications device includes but is not limited to one of the following: a terminal and a second communications network element (such as a RAN network element of a first network or a CN network element of the first network). The operation method includes the following steps.

Step 31: Transmit all terminal capability identifiers mapped to current capabilities of a terminal.

The current capabilities of the terminal are a terminal capability set of the terminal in a first network; and the terminal capability identifier includes at least one of the following: network-related terminal capability identifier or terminal-manufacturer-related terminal capability identifier.

In an implementation, when a fourth condition is met, all the terminal capability identifiers mapped to the current capabilities of the terminal are transmitted, where the fourth condition includes at least one of the following:

the terminal enters an idle state;

the terminal enters a connected state again after being in an idle state;

the terminal is detached from a first network;

the terminal is deregistered from a first network;

the terminal initially registers with a first network; or the terminal is initially attached to a first network.

In an implementation, the transmitting all terminal capability identifiers mapped to current capabilities of a terminal includes: transmitting, to the core network element, all the terminal capability identifiers mapped to the current capabilities of the terminal, where all the terminal capability identifiers mapped to the current capabilities of the terminal are carried in an encrypted context.

In this embodiment of this disclosure, the third communications device transmits, to the network side, all the terminal capability identifiers mapped to the current capabilities of the terminal, and the network side can determine to use which type of terminal capability identifier, so as to manage the terminal capability identifier, so that the network and the terminal are consistent in use of the terminal capability identifier.

Figure 4:
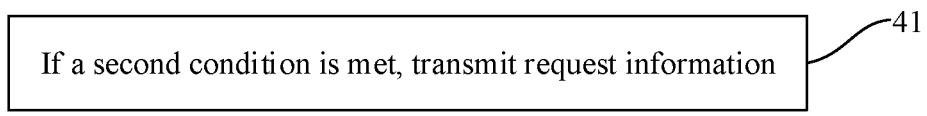
FIG. 4 is a schematic flowchart of a terminal capability identifier operation method according to embodiment 4 of this disclosure.

Referring to FIG. 4, FIG. 4 is a terminal capability identifier operation method according to Embodiment 4 of this disclosure, applied to a fourth communications device. The fourth communications device includes but is not limited to one of the following: a first communications network element (such as a CN network element of a first network, or a RAN network element of the first network). The operation method includes the following steps.

Step 41: If a second condition is met, transmit request information, where the request information includes at least one of the following:

type information of terminal capability identifier;

first request information;

request information for a terminal-manufacturer-related terminal capability identifier; or enquiry information about whether terminal-manufacturer-related terminal capability identifier is present.

The type information of terminal capability identifier is used for obtaining a terminal capability identifier conforming to the type information.

The first request information is used to request all types of terminal capability identifiers, and the terminal capability identifier is a terminal capability identifier mapped to a current capability of a terminal.

The second condition includes that no terminal-manufacturer-related terminal capability identifier is present.

In an implementation, the terminal capability identifier is a terminal capability identifier mapped to a current capability of the terminal; and the current capability of the terminal is a terminal capability set of the terminal in a first network.

In an implementation, the type of terminal capability identifier includes at least one of the following: a terminal-manufacturer-related terminal capability identifier type or a network-related terminal capability identifier type.

In this embodiment of this disclosure, the fourth communications device requests for the terminal capability identifier, so that the network and the terminal are consistent in use of the terminal capability identifier.

Figure 5:
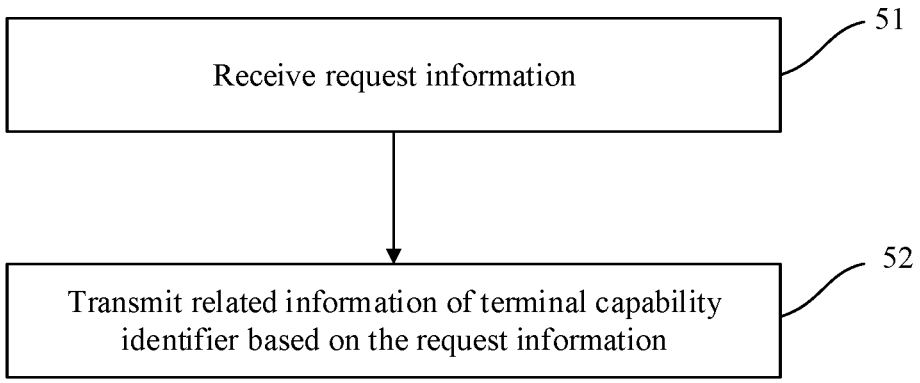
FIG. 5 is a schematic flowchart of a terminal capability identifier operation method according to embodiment 5 of this disclosure.

Referring to FIG. 5, FIG. 5 is a terminal capability identifier operation method according to Embodiment 5 of this disclosure, applied to a third communications device. The third communications device includes but is not limited to one of the following: a terminal and a second communications network element (such as a RAN network element of a first network or a CN network element of the first network). The operation method includes the following steps.

Step 51: Receive request information, where the request information includes at least one of the following:
- type information of terminal capability identifier;
- first request information;
- request information for a terminal-manufacturer-related terminal capability identifier; or
- enquiry information about whether terminal-manufacturer-related terminal capability identifier is present.

The type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal.

Step 52: Transmit related information of the terminal capability identifier based on the request information.

In an implementation, the terminal capability identifier is a terminal capability identifier mapped to a current capability of the terminal; and
the current capability of the terminal is a capability of the terminal in a first network.

In an implementation, the type of terminal capability identifier includes at least one of the following: a terminal-manufacturer-related terminal capability identifier type or a network-related terminal capability identifier type.

In an implementation, if the request information includes type information of terminal capability identifier,
the related information of terminal capability identifier includes: a terminal capability identifier conforming to the type information.

In an implementation, if the request information includes request information for a terminal-manufacturer-related terminal capability identifier,
the related information of terminal capability identifier includes at least one of the following: a terminal-manufacturer-related terminal capability identifier, indication information that a terminal-manufacturer-related terminal capability identifier is present, or indication information that no terminal-manufacturer-related terminal capability identifier is present.

In an implementation, if the request information includes first request information,
the related information of terminal capability identifier includes: all types of terminal capability identifiers corresponding to the current capability of the terminal.

In an implementation, if the request information includes enquiry information about whether a terminal-manufacturer-related terminal capability identifier is present,
the related information of terminal capability identifier includes: indication information that a terminal-manufacturer-related terminal capability identifier is present, or indication information that no terminal-manufacturer-related terminal capability identifier is present.

The operation method for the terminal capability identifier in this embodiment of this disclosure is described below with reference to specific application scenarios.

In this embodiment of this disclosure, the third communications device transmits the related information of terminal capability identifier based on a request from the network side, so that the network and the terminal are consistent in use of the terminal capability identifier.

Embodiment of Application Scenario 1

Figure 6:
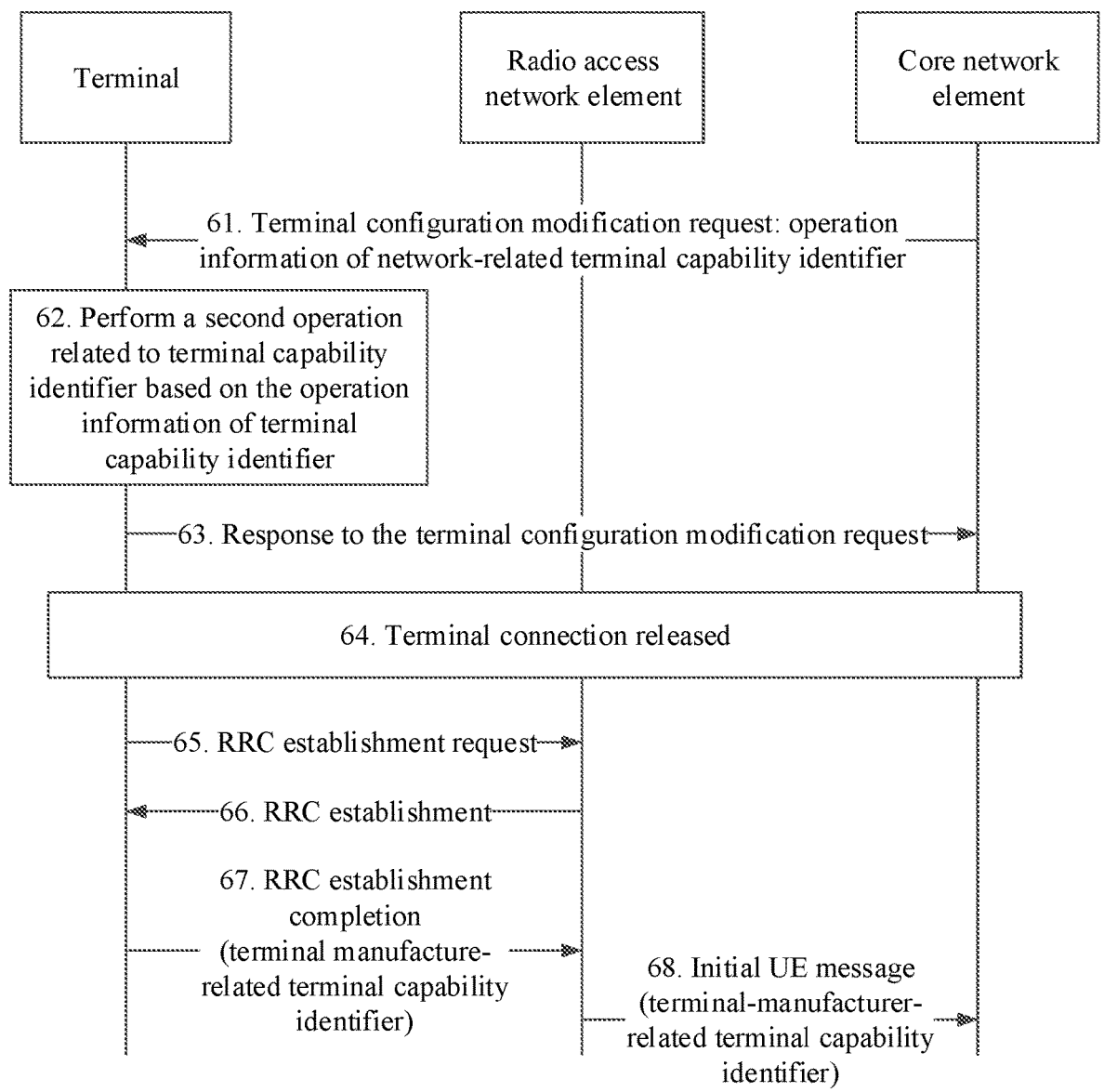
FIG. 6 is a schematic flowchart of a terminal capability identifier operation method in a first application scenario according to an embodiment of this disclosure.

The embodiment in this application scenario mainly describes a process of deleting or suspending related information of a network-related terminal capability identifier by a core network element. Referring to FIG. 6, the operation method for the terminal capability identifier in this embodiment of this disclosure includes the following steps.

Step 61: The core network element transmits operation information of terminal capability identifier to a terminal through a radio access network element.

The operation information of terminal capability identifier is described in the embodiment shown in FIG. 1, and details are not repeated herein.

In this embodiment of this disclosure, optionally, what is transmitted by the core network element to the terminal is operation information of a network-related terminal capability identifier.

In this embodiment of this disclosure, the core network element uses a terminal configuration modification request message to carry the operation information of network-related terminal capability identifier.

Step 62: The terminal performs a second operation related to terminal capability identifier based on the operation information of terminal capability identifier.

The performing a second operation related to terminal capability identifier is described in the embodiment shown in FIG. 2, and details are not repeated herein.

Step 63: In this embodiment of this disclosure, in a case that the core network element uses the terminal configuration modification request message to carry the operation information of network-related terminal capability identifier, the terminal further needs to transmit a response to the terminal configuration modification request to the core network.

Step 64: A connection between the terminal and the network is released.

Steps 65 to 67: If a third condition is met (the third condition is described in the embodiment shown in FIG. 2, and details are not repeated herein), the terminal transmits related information of a terminal-manufacturer-related terminal capability identifier.

Specifically, the terminal transmits a radio resource control (RRC) connection establishment completion message to the network, where the message contains the related information of the terminal-manufacturer-related terminal capability identifier.

Step 68: The radio access network element transmits an initial UE message to the core network element, where the message contains the related information of the terminal-manufacturer-related terminal capability identifier.

Embodiment of Application Scenario 2

Figure 7:
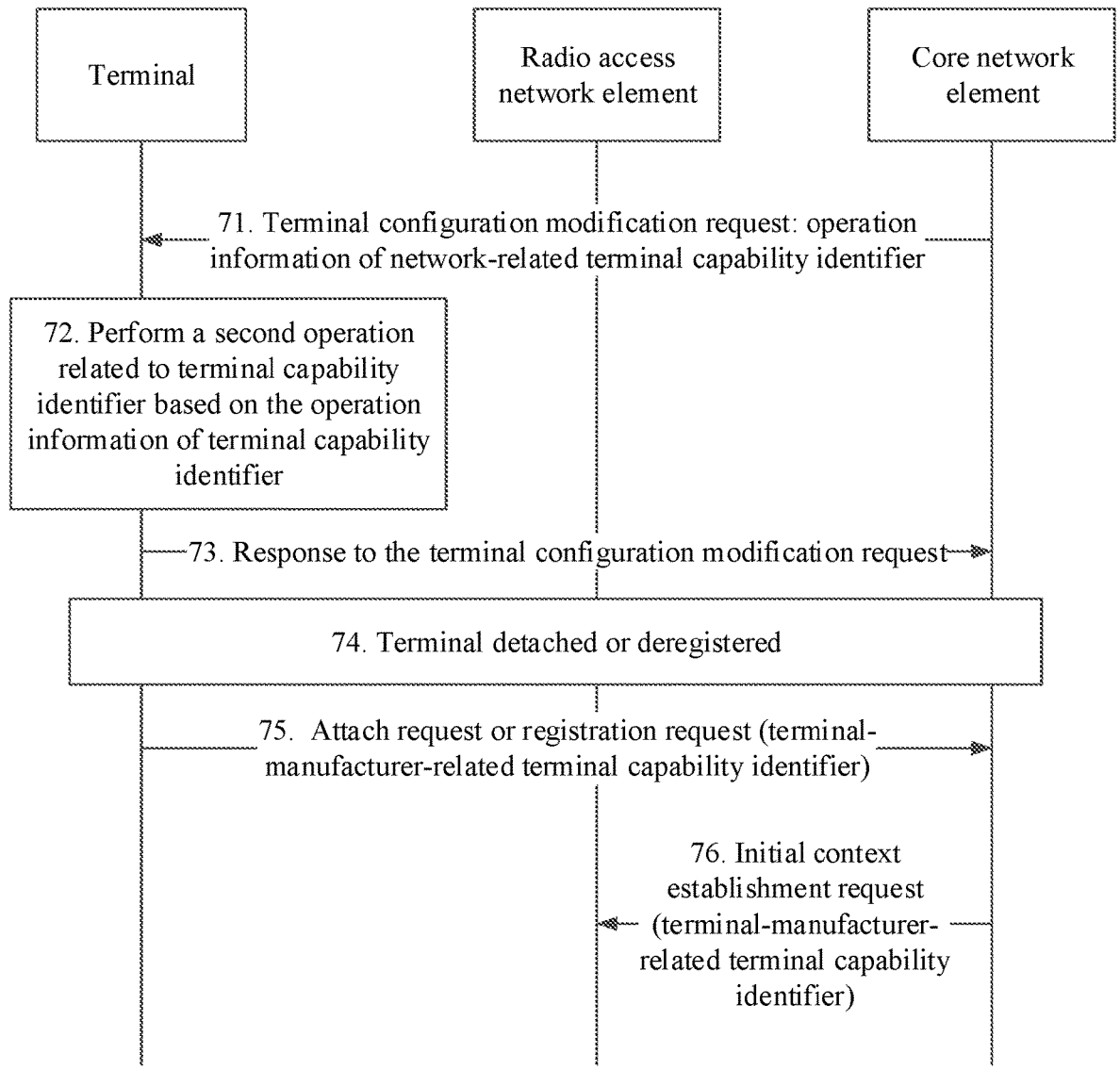
FIG. 7 is a schematic flowchart of a terminal capability identifier operation method in a second application scenario according to an embodiment of this disclosure.

The embodiment in this application scenario mainly describes a process of deleting or suspending related information of a network-related terminal capability identifier by a core network element. Referring to FIG. 7, the operation method for the terminal capability identifier in this embodiment of this disclosure includes the following steps:

Step 71: The core network element transmits operation information of terminal capability identifier to a terminal through a radio access network element.

The operation information of terminal capability identifier is described in the embodiment shown in FIG. 1, and details are not repeated herein.

In this embodiment of this disclosure, optionally, what is transmitted by the core network element to the terminal is operation information of a network-related terminal capability identifier.

In this embodiment of this disclosure, the core network element uses a terminal configuration modification request message to carry the operation information of network-related terminal capability identifier.

Step 72: The terminal performs a second operation related to terminal capability identifier based on the operation information of terminal capability identifier.

The performing a second operation related to terminal capability identifier is described in the embodiment shown in FIG. 2, and details are not repeated herein.

Step 73: In this embodiment of this disclosure, in a case that the core network element uses the terminal configuration modification request message to carry the operation information of network-related terminal capability identifier, the terminal further needs to transmit a response to the terminal configuration modification request to the core network.

Step 74: The terminal is detached or deregistered from the network.

Step 75: If a third condition is met (the third condition is described in the embodiment shown in FIG. 2, and details are not repeated herein), the terminal transmits related information of a terminal-manufacturer-related terminal capability identifier.

Specifically, the terminal transmits an initial registration request message or an attach request message to the core network element through a radio access network element, where the message contains the related information of the terminal-manufacturer-related terminal capability identifier.

Step 77: The core network element transmits an initial context establishment request message to the radio access network element, where the message contains the related information of the terminal-manufacturer-related terminal capability identifier.

Embodiment of Application Scenario 3

Figure 8:
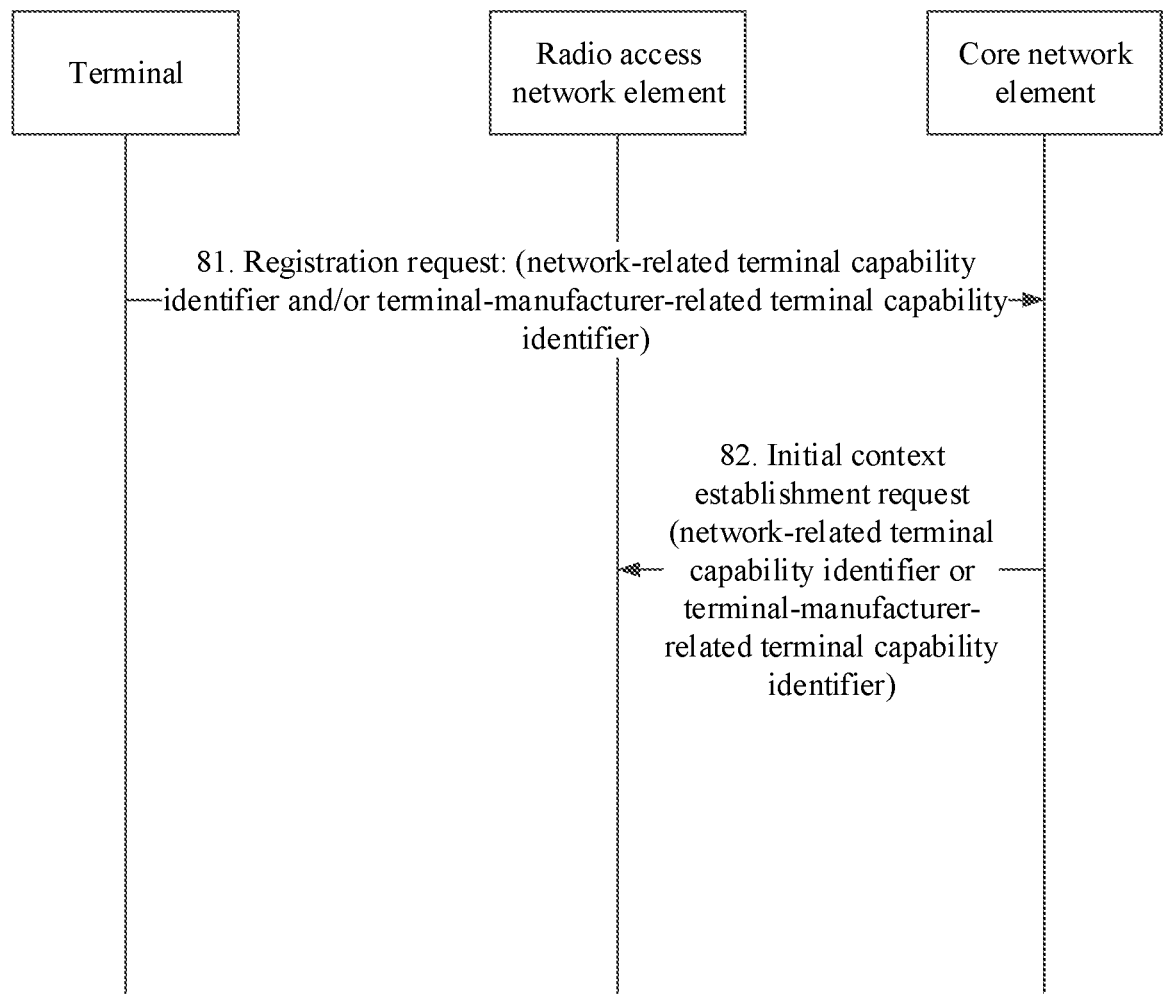
FIG. 8 is a schematic flowchart of a terminal capability identifier operation method in a third application scenario according to an embodiment of this disclosure.

The embodiment in this application scenario mainly describes a process of transmitting related information of all terminal capability identifiers mapped to current capabilities of a terminal. Referring to FIG. 8, the operation method for the terminal capability identifier in this embodiment of this disclosure includes the following steps:

Step 81: When a fourth condition is met, all terminal capability identifiers mapped to current capabilities of the terminal (for details, refer to the content described in the embodiment of FIG. 3; details are not repeated herein).

The terminal capability identifier includes at least one of the following: a network-related terminal capability identifier type or a terminal-manufacturer-related terminal capability identifier type.

Specifically, the terminal transmits an initial registration request message, or an attach request message, or a tracking area update request (TAU) message to a core network element through a radio access network element, where the message contains a terminal-manufacturer-related terminal capability identifier and/or a network-related terminal capability identifier.

The core network element may choose to use one type of terminal capability identifier.

Step 82: The core network element transmits an initial context establishment request message to the radio access network element, where the message contains the terminal-manufacturer-related terminal capability identifier or the network-related terminal capability identifier that is selected by the core network element.

Figure 9:
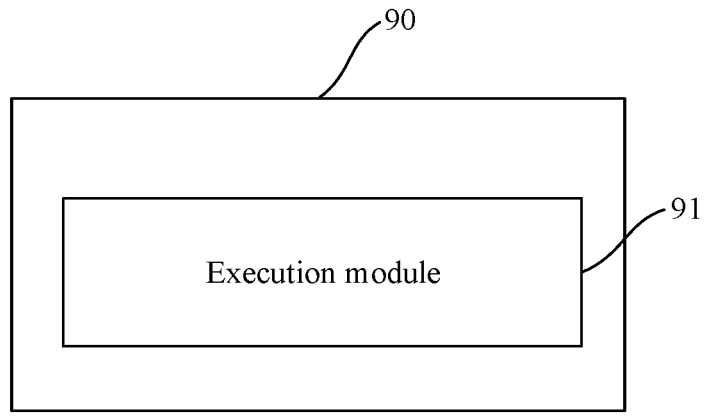
FIG. 9 is a schematic structural diagram of a communications device according to an embodiment of this disclosure.

Referring to FIG. 9, an embodiment of this disclosure further provides a communications device 90. The communications device 90 may be, but is not limited to, one of the following: a first communications network element (such as a CN network element of a first network or a RAN network element of the first network). The communications device 90 includes:

an execution module 91, configured to perform a first operation related to terminal capability identifier, where the first operation related to terminal capability identifier includes at least one of the following:

deleting or suspending a terminal capability identifier;

changing a first-type terminal capability identifier in a terminal context to a second-type terminal capability identifier; or transmitting operation information of terminal capability identifier.

In an implementation, the operation information of terminal capability identifier includes at least one of the following:

indication information indicating deleting or suspending a terminal capability identifier;

a terminal capability identifier requested to be deleted or suspended;

first indication information, where the first indication information indicates changing a first-type terminal capability identifier in a terminal context to a second-type terminal capability identifier;

second indication information, where the second indication information indicates transmitting a second-type terminal capability identifier when a terminal capability identifier needs to be transmitted;

network identification information, where the network is an updated network to which a terminal capability identifier is applicable;

network identification information, where the network is a newly-added network to which a terminal capability identifier is applicable; or network identification information, where the network is a network to which a terminal capability identifier is not applicable.

In an implementation, the terminal capability identifier is a network-related terminal capability identifier.

In an implementation, the execution module 91 is configured to: when a first condition is met, perform the first operation related to terminal capability identifier, where the first condition includes at least one of the following:

a network-related terminal capability identifier has been configured for a terminal;

a terminal capability set mapped to a terminal-manufacturer-related terminal capability identifier is obtained;

a mapping relationship between a terminal-manufacturer-related terminal capability identifier and a terminal capability set is obtained, and the terminal capability set is consistent with a current capability of the terminal; or a terminal-manufacturer-related terminal capability identifier mapped to a current capability of the terminal is obtained.

The current capability of the terminal is a terminal capability set of the terminal in a first network.

In an implementation, if the operation information of terminal capability identifier includes at least one of the following: indication information indicating suspending a terminal capability identifier or a terminal capability identifier requested to be suspended.

The communications device further includes:
a first transmitting module, configured to: after the operation information of terminal capability identifier is transmitted, transmit restoring operation information of terminal capability identifier, where the restoring operation information of terminal capability identifier is used for restoring a suspended terminal capability identifier.

The restoring operation information of terminal capability identifier includes at least one of the following: indication information indicating restoring a terminal capability identifier or a terminal capability identifier requested to be restored.

In an implementation, the communications device is a core network element or a radio access network element.

In an implementation, the communications device further includes:
a second transmitting module, configured to: if a second condition is met, transmit request information, where the request information includes at least one of the following: type information of terminal capability identifier, first request information, request information for a terminal-manufacturer-related terminal capability identifier, or enquiry information about whether a terminal-manufacturer-related terminal capability identifier is present.

The type information of terminal capability identifier is used for obtaining a terminal capability identifier conforming to the type information.

The first request information is used to request all types of terminal capability identifiers, and the terminal capability identifier is a terminal capability identifier mapped to a current capability of a terminal.

The second condition includes that no terminal-manufacturer-related terminal capability identifier is present.

In an implementation, the terminal capability identifier is a terminal capability identifier mapped to a current capability of the terminal; and
the current capability of the terminal is a terminal capability set of the terminal in a first network.

In an implementation, the type of terminal capability identifier includes at least one of the following: a terminal-manufacturer-related terminal capability identifier type or a network-related terminal capability identifier type.

Figure 10:
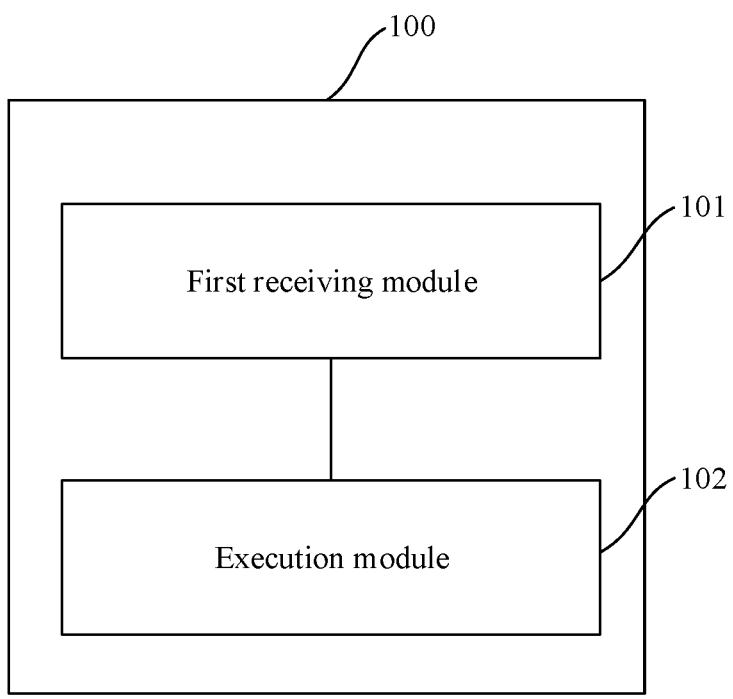
FIG. 10 is a schematic structural diagram of a terminal according to an embodiment of this disclosure.

Referring to FIG. 10, an embodiment of this disclosure further provides a communications device 100. The communications device 100 includes but is not limited to one of the following: a terminal and a second communications network element (such as a RAN network element of a first network or a CN network element of the first network). For the operation method, the communications device 100 includes:
a first receiving module 101, configured to receive operation information of terminal capability identifier, where the operation information of terminal capability identifier includes at least one of the following:
indication information indicating deleting or suspending a terminal capability identifier;
a terminal capability identifier requested to be deleted or suspended;
first indication information, where the first indication information indicates changing a first-type terminal capability identifier in a terminal context to a second-type terminal capability identifier;
second indication information, where the second indication information indicates transmitting a second-type terminal capability identifier when a terminal capability identifier needs to be transmitted;
network identification information, where the network is an updated network to which a terminal capability identifier is applicable;
network identification information, where the network is a newly-added network to which a terminal capability identifier is applicable; or
network identification information, where the network is a network to which a terminal capability identifier is not applicable; and
an execution module 102, configured to perform a second operation related to terminal capability identifier based on the operation information of terminal capability identifier.

In an implementation, the terminal capability identifier is a network-related terminal capability identifier.

In an implementation, the execution module 102 is configured to: if a third condition is met, perform the second operation related to terminal capability identifier based on the operation information of terminal capability identifier.

The third condition includes at least one of the following:
the terminal enters an idle state;
the terminal enters a connected state again after being in an idle state;
the terminal is detached from a first network;
the terminal is deregistered from a first network;
the terminal initially registers with a first network; or
the terminal is initially attached to a first network.

In an implementation, the execution module 102 performs at least one of the following:
performing a corresponding operation on a network-related terminal capability identifier based on the operation information of terminal capability identifier;
performing a corresponding operation on a terminal-manufacturer-related terminal capability identifier based on the operation information of terminal capability identifier;
transmitting a terminal-manufacturer-related terminal capability identifier;
transmitting a second-type terminal capability identifier; or
updating a network to a network-related terminal capability identifier is applicable.

In an implementation, if the operation information of terminal capability identifier includes a terminal capability identifier requested to be deleted or suspended, the execution module 102 is configured to delete or suspend a terminal capability identifier that is indicated by the operation information of terminal capability identifier.

In an implementation, if the operation information of terminal capability identifier includes the first indication information, the execution module 102 is configured to change the first-type terminal capability identifier in the terminal context to the second-type terminal capability identifier.

In an implementation, if the operation information of terminal capability identifier includes the second indication information, the execution module 102 is configured to transmit the second-type terminal capability identifier when a terminal capability identifier needs to be transmitted.

In an implementation, if the operation information of terminal capability identifier includes indication information indicating deleting or suspending a terminal capability identifier, the execution module 102 is configured to perform at least one of the following: deleting or suspending a network-related terminal capability identifier, or deleting or suspending related information of a network to which a network-related terminal capability identifier is applicable.

In an implementation, if the operation information of terminal capability identifier includes network identification information, and the network is an updated network to which a terminal capability identifier is applicable, the execution module 102 is configured to update, based on the network identification information, a network to which the network-related terminal capability identifier is applicable.

In an implementation, if the operation information of terminal capability identifier includes the network identification information, and the network is the newly-added network to which the terminal capability identifier is applicable, the execution module 102 is configured to add the network identification information to networks to which the network-related terminal capability identifier is applicable.

In an implementation, if the operation information of terminal capability identifier includes the network identification information, and the network is the network to which the terminal capability identifier is not applicable, the execution module 102 is configured to delete the network identification information from networks to the network-related terminal capability identifier is applicable.

In an implementation, the communications device 100 further includes:
  a second receiving module, configured to receive restoring operation information of terminal capability identifier, where the restoring operation information of terminal capability identifier is used for restoring a suspended terminal capability identifier.

The restoring operation information of terminal capability identifier includes at least one of the following: indication information indicating restoring a terminal capability identifier or a terminal capability identifier requested to be restored.

In an implementation, the communications device 100 further includes:
  a third receiving module, configured to receive request information, where the request information includes at least one of the following:
  type information of terminal capability identifier, first request information, request information for a terminal-manufacturer-related terminal capability identifier, or enquiry information about whether a terminal-manufacturer-related terminal capability identifier is present; where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and
  transmit related information of the terminal capability identifier based on the request information.

In an implementation, the terminal capability identifier is a terminal capability identifier mapped to a current capability of a terminal, and the current capability of the terminal is a terminal capability set of the terminal in a first network.

In an implementation, the type of terminal capability identifier includes at least one of the following: a terminal-manufacturer-related terminal capability identifier type or a network-related terminal capability identifier type.

In an implementation, if the request information includes type information of terminal capability identifier,
  the related information of terminal capability identifier includes: a terminal capability identifier conforming to the type information.

In an implementation, if the request information includes request information for a terminal-manufacturer-related terminal capability identifier,
  the related information of terminal capability identifier includes at least one of the following: a terminal-manufacturer-related terminal capability identifier, indication information that a terminal-manufacturer-related terminal capability identifier is present, or indication information that no terminal-manufacturer-related terminal capability identifier is present.

In an implementation, if the request information includes enquiry information about whether a terminal-manufacturer-related terminal capability identifier is present,
  the related information of terminal capability identifier includes: indication information that a terminal-manufacturer-related terminal capability identifier is present, or indication information that no terminal-manufacturer-related terminal capability identifier is present.

In an implementation, if the request information includes first request information,
  the related information of terminal capability identifier includes: all types of terminal capability identifiers corresponding to the current capability of the terminal.

Figure 11:
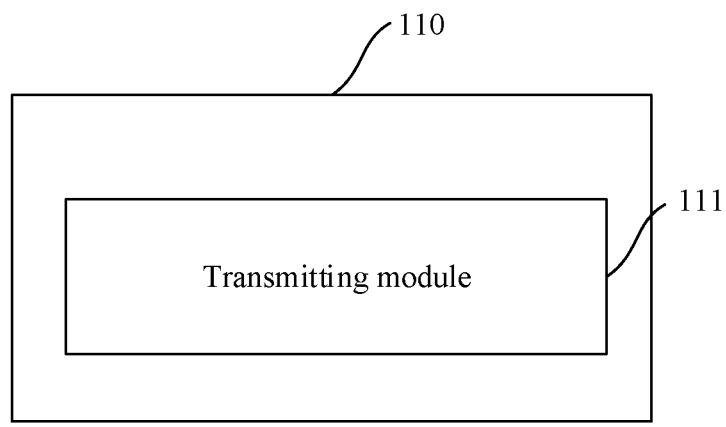
FIG. 11 is a schematic structural diagram of a terminal according to another embodiment of this disclosure.

Referring to FIG. 11, an embodiment of this disclosure further provides a communications device 110, not limited to one of the following: a terminal and a second communications network element (such as a RAN network element of a first network or a CN network element of the first network). The communications device 110 includes:
  a transmitting module 111, configured to transmit all terminal capability identifiers mapped to current capabilities of a terminal; where
  the current capabilities of the terminal are a terminal capability set of the terminal in a first network; and
  the terminal capability identifier includes at least one of the following: network-related terminal capability identifier or terminal-manufacturer-related terminal capability identifier.

In an implementation, the transmitting module 111 is configured to: when a fourth condition is met, transmit all the terminal capability identifiers mapped to the current capabilities of the terminal, where the fourth condition includes at least one of the following:
  the terminal enters an idle state;
  the terminal enters a connected state again after being in an idle state;
  the terminal is detached from a first network;
  the terminal is deregistered from a first network;
  the terminal initially registers with a first network; or
  the terminal is initially attached to a first network.

In an implementation, the transmitting module 111 is configured to transmit, to a core network element, all terminal capability identifiers mapped to the current capabilities of the terminal, where all the terminal capability identifiers mapped to the current capabilities of the terminal are carried in an encrypted context.

Figure 12:
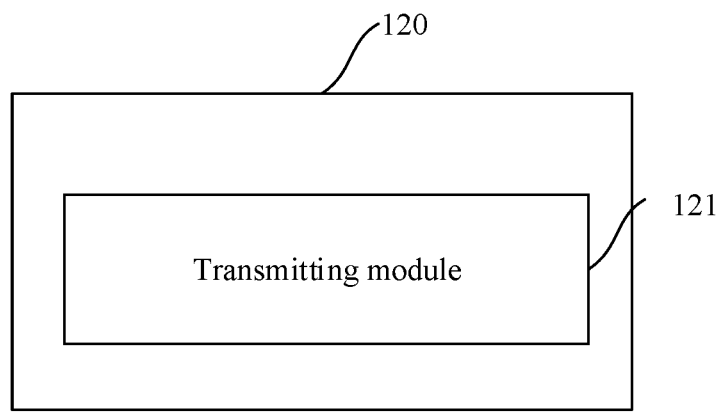
FIG. 12 is a schematic structural diagram of a communications device according to another embodiment of this disclosure.

Referring to FIG. 12, an embodiment of this disclosure further provides a communications device 120. The communications device 120 may be, but is not limited to, one of the following: a first communications network element (such as a CN network element of a first network, or a RAN network element of the first network). The communications device 120 includes:
  a transmitting module 121, configured to: if a second condition is met, transmit request information, where the request information includes at least one of the following: type information of terminal capability identifier, first request information, request information for a terminal-manufacturer-related terminal capability identifier, or enquiry information about whether a terminal-manufacturer-related terminal capability identifier is present.

The type information of terminal capability identifier is used for obtaining a terminal capability identifier conforming to the type information.

The first request information is used to request all types of terminal capability identifiers, and the terminal capability identifier is a terminal capability identifier mapped to a current capability of a terminal.

The second condition includes that no terminal-manufacturer-related terminal capability identifier is present.

In an implementation, the terminal capability identifier is a terminal capability identifier mapped to a current capability of the terminal; and the current capability of the terminal is a terminal capability set of the terminal in a first network.

In an implementation, the type of terminal capability identifier includes at least one of the following: a terminal-manufacturer-related terminal capability identifier type or a network-related terminal capability identifier type.

Figure 13:
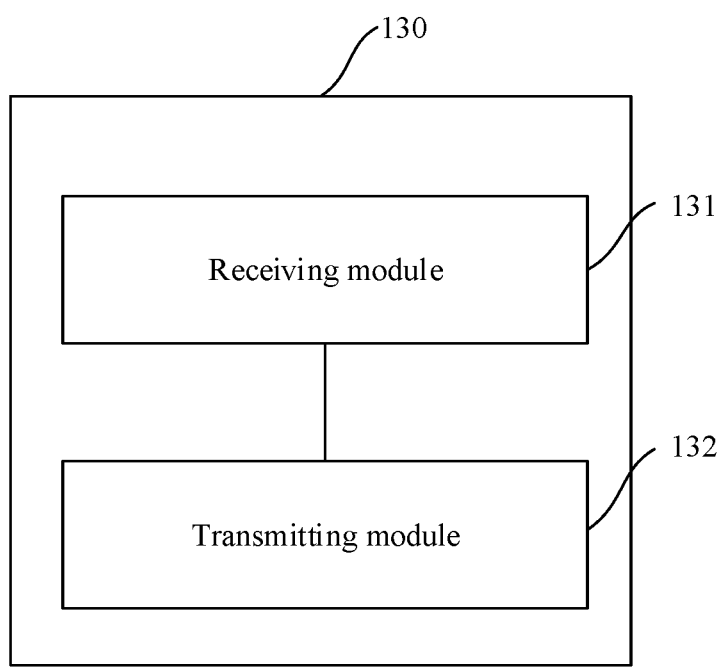
FIG. 13 is a schematic structural diagram of a terminal according to still another embodiment of this disclosure.

Referring to FIG. 13, an embodiment of this disclosure further provides a communications device 130. The communications device 130 may be, but is not limited to, one of the following: a terminal and a second communications network element (such as a RAN network element of a first network or a CN network element of the first network). The communications device 130 includes:

a receiving module 131, configured to receive request information, where the request information includes at least one of the following: type information of terminal capability identifier, first request information, request information for a terminal-manufacturer-related terminal capability identifier, or enquiry information about whether a terminal-manufacturer-related terminal capability identifier is present, where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and a transmitting module 132, configured to transmit related information of the terminal capability identifier based on the request information.

In an implementation, the terminal capability identifier is a terminal capability identifier mapped to a current capability of a terminal, and the current capability of the terminal is a capability of the terminal in a first network.

In an implementation, the type of terminal capability identifier includes at least one of the following: a terminal-manufacturer-related terminal capability identifier type or a network-related terminal capability identifier type.

In an implementation, if the request information includes type information of terminal capability identifier, the related information of terminal capability identifier includes: a terminal capability identifier conforming to the type information.

In an implementation, if the request information includes request information for a terminal-manufacturer-related terminal capability identifier, the related information of terminal capability identifier includes at least one of the following: a terminal-manufacturer-related terminal capability identifier, indication information that a terminal-manufacturer-related terminal capability identifier is present, or indication information that no terminal-manufacturer-related terminal capability identifier is present.

In an implementation, if the request information includes first request information, the related information of terminal capability identifier includes: all types of terminal capability identifiers corresponding to the current capability of the terminal.

In an implementation, if the request information includes enquiry information about whether a terminal-manufacturer-related terminal capability identifier is present, the related information of terminal capability identifier includes: indication information that a terminal-manufacturer-related terminal capability identifier is present, or indication information that no terminal-manufacturer-related terminal capability identifier is present.

Figure 14:
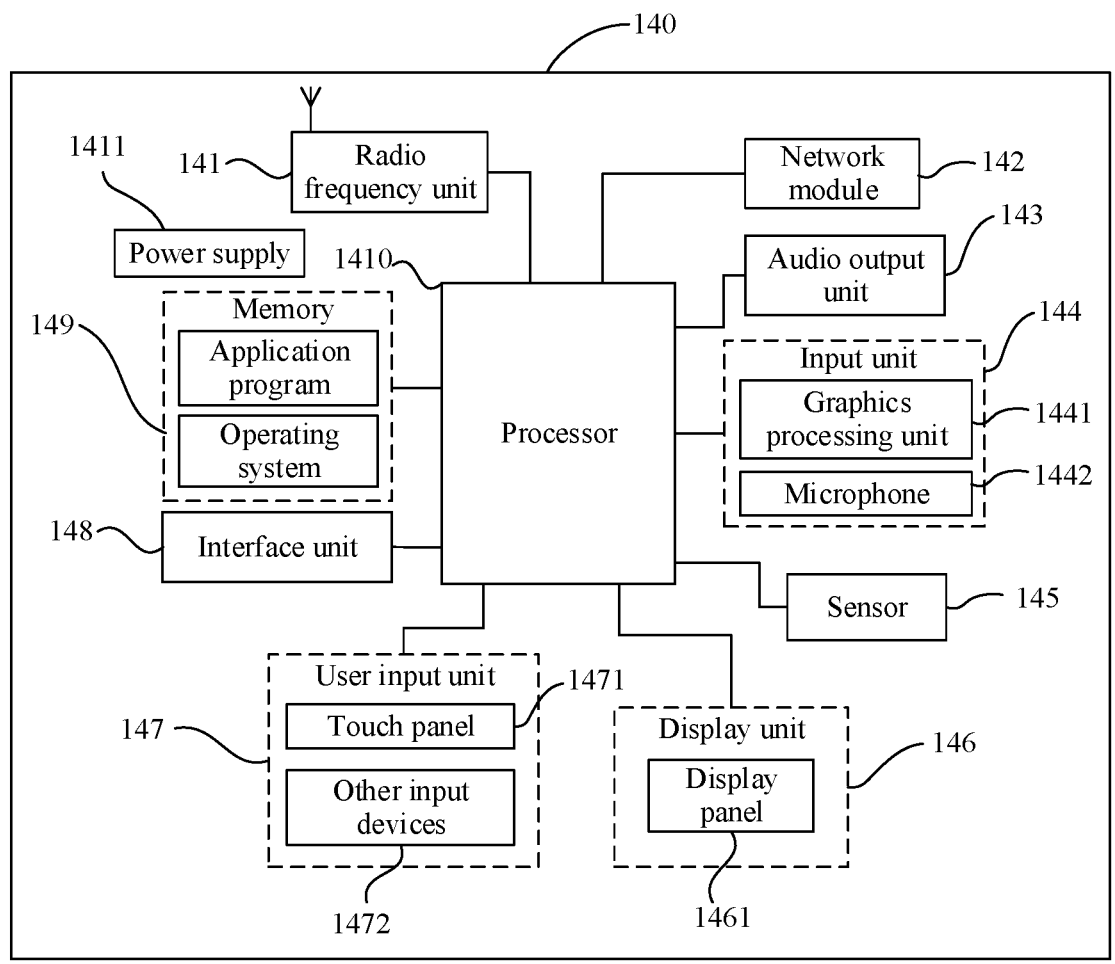
FIG. 14 is a schematic structural diagram of a terminal according to yet another embodiment of this disclosure.

Referring to FIG. 14, FIG. 14 is a schematic structural diagram of a terminal according to another embodiment of this disclosure. The terminal 140 includes but is not limited to components such as a radio frequency unit 141, a network module 142, an audio output unit 143, an input unit 144, a sensor 145, a display unit 146, a user input unit 147, an interface unit 148, a memory 149, a processor 1410, and a power supply 1411. A person skilled in the art may understand that the structure of the terminal shown in FIG. 14 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 141 is configured to receive operation information of terminal capability identifier, where the operation information of terminal capability identifier includes at least one of the following:

indication information indicating deleting or suspending a terminal capability identifier;

a terminal capability identifier requested to be deleted or suspended;

first indication information, where the first indication information indicates changing a first-type terminal capability identifier in a terminal context to a second-type terminal capability identifier;

second indication information, where the second indication information indicates transmitting a second-type terminal capability identifier when a terminal capability identifier needs to be transmitted;

network identification information, where the network is an updated network to which a terminal capability identifier is applicable;

network identification information, where the network is a newly-added network to which a terminal capability identifier is applicable; or network identification information, where the network is a network to which a terminal capability identifier is not applicable.

The processor 1410 is configured to perform a second operation related to terminal capability identifier based on the operation information of terminal capability identifier.

Alternatively, the radio frequency unit 141 is configured to transmit all terminal capability identifiers mapped to current capabilities of a terminal; where the current capabilities of the terminal are a terminal capability set of the terminal in a first network; and the terminal capability identifier includes at least one of the following: network-related terminal capability identifier or terminal-manufacturer-related terminal capability identifier.

Alternatively, the radio frequency unit 141 is configured to receive request information, where the request information includes at least one of the following: type information of terminal capability identifier, first request information, request information for a terminal-manufacturer-related terminal capability identifier, or enquiry information about whether a terminal-manufacturer-related terminal capability identifier is present; where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and the processor 1410 is configured to transmit related information of the terminal capability identifier based on the request information.

It should be understood that, in this embodiment of this disclosure, the radio frequency unit 141 may be configured to: receive and transmit signals in an information receiving/transmitting process or a call process; and specifically, after receiving downlink data from a base station, transmit the downlink information to the processor 1410 for processing, and in addition, transmit uplink data to the base station. Generally, the radio frequency unit 141 includes but is not limited to an antenna, at least one amplifier, a transceiver, a coupler, a low noise amplifier, a duplexer, and the like. In addition, the radio frequency unit 141 may also communicate with a network and other devices via a wireless communications system.

The terminal provides a user with wireless broadband internet access through the network module 142, for example, helping the user to transmit and receive e-mails, browse web pages, and access streaming media.

The audio output unit 143 may convert audio data received by the radio frequency unit 141 or the network module 142 or stored in the memory 149 into an audio signal and output the audio signal as a sound. Furthermore, the audio output unit 143 may also provide audio output (for example, a call signal received sound or a message received sound) related to a specific function performed by the terminal 140. The audio output unit 143 includes a speaker, a buzzer, a receiver, and the like.

The input unit 144 is configured to receive an audio or video signal. The input unit 144 may include a graphics processing unit (GPU) 1441 and a microphone 1442. The graphics processing unit 1441 processes image data of a still picture or video obtained by an image capture apparatus (such as a camera) in a video capture mode or an image capture mode. A processed image frame may be displayed on the display unit 146. The image frame processed by the graphics processing unit 1441 may be stored in the memory 149 (or another storage medium) or be transmitted by the radio frequency unit 141 or the network module 142. The microphone 1442 is capable of receiving sounds and processing such sounds into audio data. The processed audio data may be converted in a telephone call mode into a format that can be transmitted by the radio frequency unit 141 to a mobile communications base station, for outputting.

The terminal 140 may further include at least one sensor 145, for example, an optical sensor, a motion sensor, and another sensor. Specifically, the optical sensor may include an ambient light sensor and a proximity sensor. The ambient light sensor may adjust luminance of the display panel 1461 based on brightness of ambient light, and the proximity sensor may turn off the display panel 1461 and/or backlight when the terminal 140 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 145 may also include a fingerprint sensor, a pressure sensor, an iris sensor, a molecular sensor, a gyroscope, a barometer, a hygrometer, a thermometer, an infrared sensor, and the like. Details are not described herein.

The display unit 146 is configured to display information input by the user or information provided to the user. The display unit 146 may include a display panel 1461, and the display panel 1461 may be configured in a form of a liquid crystal display (LCD), an organic light-emitting diode (OLED), or the like.

The user input unit 147 may be configured to receive input digit or character information and generate key signal input related to user setting and function control of the mobile terminal. Specifically, the user input unit 147 may include a touch panel 1471 and other input devices 1472. The touch panel 1471 is also referred to as a touchscreen and can collect a touch operation (such as an operation performed by the user on the touch panel 1471 or near the touch panel 1471 with a finger or by using any proper object or accessory such as a stylus) of the user on or near the touch panel 1471. The touch panel 1471 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 1410, and can receive a command transmitted by the processor 1410 and execute the command. In addition, the touch panel 1471 may be implemented in a plurality of forms, for example, as a resistive, capacitive, infrared, or surface acoustic wave touch panel. In addition to the touch panel 1471, the user input unit 147 may further include other input devices 1472. Specifically, the other input devices 1472 may include but are not limited to a physical keyboard, a function key (such as a volume control key or an on/off key), a trackball, a mouse, and a joystick. Details are not described herein.

Further, the touch panel 1471 may cover the display panel 1461. When detecting a touch operation on or near the touch panel 1471, the touch panel 1471 transmits the touch operation to the processor 1410 to determine a type of a touch event. Then, the processor 1410 provides a corresponding visual output on the display panel 1461 based on the type of the touch event. Although in FIG. 14, the touch panel 1471 and the display panel 1461 act as two independent parts to implement input and output functions of the terminal, in some embodiments, the touch panel 1471 and the display panel 1461 may be integrated to implement the input and output functions of the terminal. This is not specifically limited herein.

The interface unit 148 is an interface between an external apparatus and the terminal 140. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 148 may be configured to: receive input (for example, data information and power) from the external apparatus, and transmit the received input to one or more elements in the terminal 140, or may be configured to transmit data between the terminal 140 and the external apparatus.

The memory 149 may be configured to store software programs and various data. The memory 149 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 149 may include a high-speed random access memory, and may further include a non-volatile memory such as at least one disk storage device, a flash memory device, or another volatile solid-state storage device.

The processor 1410 is a control center of the terminal, and is connected to all components of the terminal by using various interfaces and lines. By running or executing a software program and/or module that is stored in the memory 149 and calling data stored in the memory 149, the processor 1410 executes various functions of the terminal and processes data, so as to perform overall monitoring on the terminal. The processor 1410 may include one or more processing units. Optionally, an application processor and a modem processor may be integrated in the processor 1410. The application processor primarily processes an operating system, user interfaces, application programs, and the like. The modem processor primarily processes radio communication. It can be understood that the modem processor may alternatively be not integrated in the processor 1410.

The terminal 140 may further include the power supply 1411 (for example, a battery) supplying power to all components. Optionally, the power supply 1411 may be logically connected to the processor 1410 through a power management system. In this way, functions such as charge management, discharge management, and power consumption management are implemented by using the power management system.

In addition, the terminal 140 includes some functional modules that are not shown. Details are not described herein.

An embodiment of this disclosure further provides a communications device, and the communications device includes a processor and a memory. In this embodiment of this disclosure, the communications device further includes a computer program stored in the memory and capable of running on the processor. When the computer program is executed by the processor, the following step is implemented:

performing a first operation related to terminal capability identifier, where the first operation related to terminal capability identifier includes at least one of the following:

deleting or suspending a terminal capability identifier;

changing a first-type terminal capability identifier in a terminal context to a second-type terminal capability identifier; or transmitting operation information of terminal capability identifier.

Optionally, the operation information of terminal capability identifier includes at least one of the following:

indication information indicating deleting or suspending a terminal capability identifier;

a terminal capability identifier requested to be deleted or suspended;

first indication information, where the first indication information indicates changing a first-type terminal capability identifier in a terminal context to a second-type terminal capability identifier;

second indication information, where the second indication information indicates transmitting a second-type terminal capability identifier when a terminal capability identifier needs to be transmitted;

network identification information, where the network is an updated network to which a terminal capability identifier is applicable;

network identification information, where the network is a newly-added network to which a terminal capability identifier is applicable; or network identification information, where the network is a network to which a terminal capability identifier is not applicable.

Optionally, when the computer program is executed by the processor, the following step may be further implemented:

when a first condition is met, performing the first operation related to terminal capability identifier, where the first condition includes at least one of the following:

a network-related terminal capability identifier has been configured for a terminal;

a terminal capability set mapped to a terminal-manufacturer-related terminal capability identifier is obtained;

a mapping relationship between a terminal-manufacturer-related terminal capability identifier and a terminal capability set is obtained, and the terminal capability set is consistent with a current capability of the terminal; or a terminal-manufacturer-related terminal capability identifier mapped to a current capability of the terminal is obtained.

The current capability of the terminal is a terminal capability set of the terminal in a first network.

Optionally, when the computer program is executed by the processor, the following step may be further implemented:

if the operation information of terminal capability identifier includes at least one of the following: indication information indicating suspending a terminal capability identifier or a terminal capability identifier requested to be suspended;

after the transmitting the operation information of terminal capability identifier, the following is further included: transmitting restoring operation information of terminal capability identifier, where the restoring operation information of terminal capability identifier is used for restoring a suspended terminal capability identifier; and the restoring operation information of terminal capability identifier includes at least one of the following: indication information indicating restoring a terminal capability identifier or a terminal capability identifier requested to be restored.

Optionally, when the computer program is executed by the processor, the following step may be further implemented:
  before the performing a first operation related to terminal capability identifier, the following is further included:
  if a second condition is met, transmitting request information, where the request information includes at least one of the following: type information of terminal capability identifier, first request information, request information for a terminal-manufacturer-related terminal capability identifier, or enquiry information about whether a terminal-manufacturer-related terminal capability identifier is present.

The type information of terminal capability identifier is used for obtaining a terminal capability identifier conforming to the type information.

The first request information is used to request all types of terminal capability identifiers, and the terminal capability identifier is a terminal capability identifier mapped to a current capability of a terminal.

The second condition includes that no terminal-manufacturer-related terminal capability identifier is present.

Optionally, the terminal capability identifier is a terminal capability identifier mapped to a current capability of the terminal; and
  the current capability of the terminal is a terminal capability set of the terminal in a first network.

Optionally, the type of terminal capability identifier includes at least one of the following: a terminal-manufacturer-related terminal capability identifier type or a network-related terminal capability identifier type.

An embodiment of this disclosure further provides a terminal, and the terminal includes a processor and a memory. In this embodiment of this disclosure, the terminal further includes a computer program stored in the memory and capable of running on the processor. When the computer program is executed by the processor, the following steps are implemented:
  receiving operation information of terminal capability identifier, where the operation information of terminal capability identifier includes at least one of the following:
  indication information indicating deleting or suspending a terminal capability identifier;
  a terminal capability identifier requested to be deleted or suspended;
  first indication information, where the first indication information indicates changing a first-type terminal capability identifier in a terminal context to a second-type terminal capability identifier;
  second indication information, where the second indication information indicates transmitting a second-type terminal capability identifier when a terminal capability identifier needs to be transmitted;
  network identification information, where the network is an updated network to which a terminal capability identifier is applicable;
  network identification information, where the network is a newly-added network to which a terminal capability identifier is applicable; or
  network identification information, where the network is a network to which a terminal capability identifier is not applicable; and
  performing a second operation related to terminal capability identifier based on the operation information of terminal capability identifier.

Optionally, the terminal capability identifier is a network-related terminal capability identifier.

Optionally, when the computer program is executed by the processor, the following step may be further implemented:
  the performing a second operation related to terminal capability identifier based on the operation information of terminal capability identifier includes:
  if a third condition is met, performing the second operation related to terminal capability identifier based on the operation information of terminal capability identifier.

The third condition includes at least one of the following:
  the terminal enters an idle state;
  the terminal enters a connected state again after being in an idle state;
  the terminal is detached from a first network;
  the terminal is deregistered from a first network;
  the terminal initially registers with a first network; or
  the terminal is initially attached to a first network.

Optionally, when the computer program is executed by the processor, the following step may be further implemented:
  the performing a second operation related to terminal capability identifier based on the operation information of terminal capability identifier includes at least one of the following:
  performing a corresponding operation on a network-related terminal capability identifier based on the operation information of terminal capability identifier;
  performing a corresponding operation on a terminal-manufacturer-related terminal capability identifier based on the operation information of terminal capability identifier;
  transmitting a terminal-manufacturer-related terminal capability identifier;
  transmitting a second-type terminal capability identifier; or
  updating a network to a network-related terminal capability identifier is applicable.

Optionally, when the computer program is executed by the processor, the following step may be further implemented:
  if the operation information of terminal capability identifier includes a terminal capability identifier requested to be deleted or suspended,
  the performing a second operation related to terminal capability identifier based on the operation information of terminal capability identifier include: deleting or suspending the terminal capability identifier that is indicated by the operation information of terminal capability identifier.

Optionally, when the computer program is executed by the processor, the following step may be further implemented:
  if the operation information of terminal capability identifier includes first indication information, the performing a second operation related to terminal capability identifier based on the operation information of terminal capability identifier includes: changing a first-type terminal capability identifier in a terminal context to a second-type terminal capability identifier; and
  if the operation information of terminal capability identifier includes second indication information, the performing a second operation related to terminal capability identifier based on the operation information of terminal capability identifier includes: transmitting a second-type terminal capability identifier when a terminal capability identifier needs to be transmitted.

Optionally, when the computer program is executed by the processor, the following step may be further implemented:
- if the operation information of terminal capability identifier includes indication information indicating deleting or suspending a terminal capability identifier,
- the performing a corresponding operation on a network-related terminal capability identifier based on the operation information of terminal capability identifier includes at least one of the following: deleting or suspending a network-related terminal capability identifier, or deleting or suspending related information of a network to which a network-related terminal capability identifier is applicable.

Optionally, when the computer program is executed by the processor, the following steps may be further implemented:
- if the operation information of terminal capability identifier includes: network identification information, and the network is an updated network to which a terminal capability identifier is applicable, the performing a corresponding operation on a network-related terminal capability identifier based on the operation information of terminal capability identifier includes: updating, based on the network identification information, a network to which the network-related terminal capability identifier is applicable;
- if the operation information of terminal capability identifier includes: network identification information, and the network is a newly-added network to which a terminal capability identifier is applicable, the performing a corresponding operation on a network-related terminal capability identifier based on the operation information of terminal capability identifier includes: adding the network identification information to networks to which the network-related terminal capability identifier is applicable; and
- if the operation information of terminal capability identifier includes: network identification information, and the network is a network to which a terminal capability identifier is not applicable, the performing a corresponding operation on a network-related terminal capability identifier based on the operation information of terminal capability identifier includes: deleting the network identification information from networks to the network-related terminal capability identifier is applicable.

Optionally, when the computer program is executed by the processor, the following step may be further implemented:
- after the receiving operation information of terminal capability identifier, the following is further included: receiving restoring operation information of terminal capability identifier, where the restoring operation information of terminal capability identifier is used for restoring a suspended terminal capability identifier; and
- the restoring operation information of terminal capability identifier includes at least one of the following: indication information indicating restoring a terminal capability identifier or a terminal capability identifier requested to be restored.

Optionally, when the computer program is executed by the processor, the following step may be further implemented:
- before the receiving operation information of terminal capability identifier, the following is further included: receiving request information, where the request information includes at least one of the following:
- type information of terminal capability identifier, first request information, request information for a terminal-manufacturer-related terminal capability identifier, or enquiry information about whether a terminal-manufacturer-related terminal capability identifier is present; where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and
- transmitting related information of the terminal capability identifier based on the request information.

Optionally, the terminal capability identifier is a terminal capability identifier mapped to a current capability of the terminal; and
the current capability of the terminal is a terminal capability set of the terminal in a first network.

Optionally, the type of terminal capability identifier includes at least one of the following: a terminal-manufacturer-related terminal capability identifier type or a network-related terminal capability identifier type.

Optionally, if the request information includes type information of terminal capability identifier,
the related information of terminal capability identifier includes: a terminal capability identifier conforming to the type information.

Optionally, if the request information includes request information for a terminal-manufacturer-related terminal capability identifier,
the related information of terminal capability identifier includes at least one of the following: a terminal-manufacturer-related terminal capability identifier, indication information that a terminal-manufacturer-related terminal capability identifier is present, or indication information that no terminal-manufacturer-related terminal capability identifier is present.

Optionally, if the request information includes enquiry information about whether a terminal-manufacturer-related terminal capability identifier is present,
the related information of terminal capability identifier includes: indication information that a terminal-manufacturer-related terminal capability identifier is present, or indication information that no terminal-manufacturer-related terminal capability identifier is present.

Optionally, if the request information includes first request information,
the related information of terminal capability identifier includes: all types of terminal capability identifiers corresponding to the current capability of the terminal.

An embodiment of this disclosure further provides a terminal, and the terminal includes a processor and a memory. In this embodiment of this disclosure, the terminal further includes a computer program stored in the memory and capable of running on the processor. When the computer program is executed by the processor, the following step is implemented:
- transmitting all terminal capability identifiers mapped to current capabilities of a terminal; where
- the current capabilities of the terminal are a terminal capability set of the terminal in a first network; and the terminal capability identifier includes at least one of the following: network-related terminal capability identifier or terminal-manufacturer-related terminal capability identifier.

Optionally, when the computer program is executed by the processor, the following step may be further implemented:

when a fourth condition is met, transmitting all the terminal capability identifiers mapped to the current capabilities of the terminal, where the fourth condition includes at least one of the following:
the terminal enters an idle state;
the terminal enters a connected state again after being in an idle state;
the terminal is detached from a first network;
the terminal is deregistered from a first network;
the terminal initially registers with a first network; or
the terminal is initially attached to a first network.

An embodiment of this disclosure further provides a communications device, and the communications device includes a processor and a memory. In this embodiment of this disclosure, the communications device further includes a computer program stored in the memory and capable of running on the processor. When the computer program is executed by the processor, the following step is implemented:

if a second condition is met, transmitting request information, where the request information includes at least one of the following: type information of terminal capability identifier, first request information, request information for a terminal-manufacturer-related terminal capability identifier, or enquiry information about whether a terminal-manufacturer-related terminal capability identifier is present.

The type information of terminal capability identifier is used for obtaining a terminal capability identifier conforming to the type information.

The first request information is used to request all types of terminal capability identifiers, and the terminal capability identifier is a terminal capability identifier mapped to a current capability of a terminal.

The second condition includes that no terminal-manufacturer-related terminal capability identifier is present.

Optionally, the terminal capability identifier is a terminal capability identifier mapped to a current capability of the terminal; and
the current capability of the terminal is a terminal capability set of the terminal in a first network.

Optionally, the type of terminal capability identifier includes at least one of the following: a terminal-manufacturer-related terminal capability identifier type or a network-related terminal capability identifier type.

An embodiment of this disclosure further provides a terminal, and the terminal includes a processor and a memory. In this embodiment of this disclosure, the terminal further includes a computer program stored in the memory and capable of running on the processor. When the computer program is executed by the processor, the following steps are implemented:

receiving request information, where the request information includes at least one of the following: type information of terminal capability identifier, first request information, request information for a terminal-manufacturer-related terminal capability identifier, or enquiry information about whether a terminal-manufacturer-related terminal capability identifier is present;
where the type information of terminal capability identifier is used for obtaining a terminal capability identifier conforming to the type information; and the first request information is used to request all types of terminal capability identifiers, and the terminal capability identifier is a terminal capability identifier mapped to a current capability of a terminal; and
transmitting related information of the terminal capability identifier based on the request information.

Optionally, the terminal capability identifier is a terminal capability identifier mapped to a current capability of the terminal; and
the current capability of the terminal is a capability of the terminal in a first network.

Optionally, the type of terminal capability identifier includes at least one of the following: a terminal-manufacturer-related terminal capability identifier type or a network-related terminal capability identifier type.

Optionally, if the request information includes type information of terminal capability identifier,
the related information of terminal capability identifier includes: a terminal capability identifier conforming to the type information.

Optionally, if the request information includes request information for a terminal-manufacturer-related terminal capability identifier,
the related information of terminal capability identifier includes at least one of the following: a terminal-manufacturer-related terminal capability identifier, indication information that a terminal-manufacturer-related terminal capability identifier is present, or indication information that no terminal-manufacturer-related terminal capability identifier is present.

Optionally, if the request information includes first request information,
the related information of terminal capability identifier includes: all types of terminal capability identifiers corresponding to the current capability of the terminal.

Optionally, if the request information includes enquiry information about whether a terminal-manufacturer-related terminal capability identifier is present,
the related information of terminal capability identifier includes: indication information that a terminal-manufacturer-related terminal capability identifier is present, or indication information that no terminal-manufacturer-related terminal capability identifier is present.

An embodiment of this disclosure further provides a computer-readable storage medium. The computer-readable storage medium stores a computer program, and when the computer program is executed by a processor, the processes of the embodiment of the terminal capability identifier operation method are implemented, with the same technical effect achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the related art, may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (ROM), a random access memory (RAM), or the like.

It may be understood that the embodiments described in this disclosure may be implemented by hardware, software, firmware, middleware, microcode, or a combination thereof. For hardware implementation, a module, a unit, a sub-unit, a sub-module, and the like may be implemented in one or more application specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A terminal capability identifier operation method, performed by a first communications device, the first communications device being a core network (CN) network element or a radio access network (RAN) network element, wherein the method comprises:
  performing a first operation related to terminal capability identifier, wherein the first operation related to terminal capability identifier comprises at least one of the following:
  deleting or suspending a terminal capability identifier;
  changing a first-type terminal capability identifier in a terminal context to a second-type terminal capability identifier; or
  transmitting operation information of terminal capability identifier to a terminal;
  wherein the operation information of terminal capability identifier comprises at least one of the following:
  indication information indicating the terminal to delete or suspend a network-allocated terminal capability identifier;

a terminal capability identifier requested to be deleted or suspended;

first indication information, wherein the first indication information indicates changing a first-type terminal capability identifier in a terminal context to a second-type terminal capability identifier;

second indication information, wherein the second indication information indicates transmitting a second-type terminal capability identifier when a terminal capability identifier needs to be transmitted;

network identification information, wherein the network is an updated network to which a terminal capability identifier is applicable;

network identification information, wherein the network is a newly-added network to which a terminal capability identifier is applicable; or network identification information, wherein the network is a network to which a terminal capability identifier is not applicable;

wherein the first-type terminal capability identifier is the network-allocated terminal capability identifier and the second-type terminal capability identifier is a terminal-manufacturer-related terminal capability identifier.

2. The method according to claim 1, wherein the terminal capability identifier is the network-allocated terminal capability identifier.

3. The method according to claim 1, wherein when a first condition is met, the first operation related to terminal capability identifier is performed; and the first condition comprises at least one of the following:

a network-allocated terminal capability identifier has been configured for a terminal;

a terminal capability set mapped to a terminal-manufacturer-related terminal capability identifier is obtained;

a mapping relationship between a terminal-manufacturer-related terminal capability identifier and a terminal capability set is obtained, and the terminal capability set is consistent with a current capability of the terminal; or a terminal-manufacturer-related terminal capability identifier mapped to a current capability of the terminal is obtained; wherein the current capability of the terminal is a terminal capability set of the terminal in a first network.

4. The method according to claim 1, wherein if the operation information of terminal capability identifier comprises at least one of the following: indication information indicating the terminal to suspend the network-allocated terminal capability identifier or a terminal capability identifier requested to be suspended, after the transmitting the operation information of terminal capability identifier, the following is further comprised: transmitting restoring operation information of terminal capability identifier, wherein the restoring operation information of terminal capability identifier is used for restoring a suspended terminal capability identifier; and the restoring operation information of terminal capability identifier comprises at least one of the following: indication information indicating restoring a terminal capability identifier or a terminal capability identifier requested to be restored.

5. The method according to claim 1, wherein before the performing a first operation related to terminal capability identifier, the following is further comprised:

if a second condition is met, transmitting request information, wherein the request information comprises at least one of the following: type information of terminal capability identifier, first request information, request information for a terminal-manufacturer-related terminal capability identifier, or enquiry information about whether a terminal-manufacturer-related terminal capability identifier is present; wherein the type information of terminal capability identifier is used for obtaining a terminal capability identifier conforming to the type information;

the first request information is used to request all types of terminal capability identifiers, and the terminal capability identifier is a terminal capability identifier mapped to a current capability of a terminal; and the second condition comprises that no terminal-manufacturer-related terminal capability identifier is present.

6. The method according to claim 5, wherein the terminal capability identifier is a terminal capability identifier mapped to a current capability of the terminal; and the current capability of the terminal is a terminal capability set of the terminal in a first network.

7. A communications device, comprising a processor, a memory, and a computer program stored in the memory and capable of running on the processor, wherein when the computer program is executed by the processor, the steps of the terminal capability identifier operation method according to claim 1 are implemented.

8. A terminal capability identifier operation method, performed by a second communications device, the second communications device being a terminal, wherein the method comprises:

receiving operation information of terminal capability identifier, wherein the operation information of terminal capability identifier comprises at least one of the following:

indication information indicating the terminal to delete or suspend a network-allocated terminal capability identifier;

a terminal capability identifier requested to be deleted or suspended;

first indication information, wherein the first indication information indicates changing a first-type terminal capability identifier in a terminal context to a second-type terminal capability identifier;

second indication information, wherein the second indication information indicates transmitting a second-type terminal capability identifier when a terminal capability identifier needs to be transmitted;

network identification information, wherein the network is an updated network to which a terminal capability identifier is applicable;

network identification information, wherein the network is a newly-added network to which a terminal capability identifier is applicable; or network identification information, wherein the network is a network to which a terminal capability identifier is not applicable; and performing a second operation related to terminal capability identifier based on the operation information of terminal capability identifier;

wherein the first-type terminal capability identifier is the network-allocated terminal capability identifier and the second-type terminal capability identifier is a terminal-manufacturer-related terminal capability identifier.

9. The method according to claim 8, wherein the terminal capability identifier is the network-allocated terminal capability identifier.

10. The method according to claim 8, wherein the performing a second operation related to terminal capability identifier based on the operation information of terminal capability identifier comprises:
if a third condition is met, performing the second operation related to terminal capability identifier based on the operation information of terminal capability identifier; wherein
the third condition comprises at least one of the following:
the terminal enters an idle state;
the terminal enters a connected state again after being in an idle state;
the terminal is detached from a first network;
the terminal is deregistered from a first network;
the terminal initially registers with a first network; or
the terminal is initially attached to a first network.

11. The method according to claim 8, wherein the performing a second operation related to terminal capability identifier based on the operation information of terminal capability identifier comprises at least one of the following:
performing a corresponding operation on the network-allocated terminal capability identifier based on the operation information of terminal capability identifier;
performing a corresponding operation on a terminal-manufacturer-related terminal capability identifier based on the operation information of terminal capability identifier;
transmitting a terminal-manufacturer-related terminal capability identifier;
transmitting a second-type terminal capability identifier; or
updating a network to which the network-allocated terminal capability identifier is applicable.

12. The method according to claim 11, wherein
if the operation information of terminal capability identifier comprises indication information indicating the terminal to delete or suspend the network-allocated terminal capability identifier,
the performing the corresponding operation on the network-allocated terminal capability identifier based on the operation information of terminal capability identifier comprises at least one of the following: deleting or suspending the network-allocated terminal capability identifier, or deleting or suspending related information of a network to which the network-allocated terminal capability identifier is applicable.

13. The method according to claim 11, wherein
if the operation information of terminal capability identifier comprises: network identification information, and the network is an updated network to which a terminal capability identifier is applicable, the performing the corresponding operation on the network-allocated terminal capability identifier based on the operation information of terminal capability identifier comprises: updating, based on the network identification information, a network to which the network-allocated terminal capability identifier is applicable;
if the operation information of terminal capability identifier comprises: network identification information, and the network is a newly-added network to which a terminal capability identifier is applicable, the performing the corresponding operation on the network-allocated terminal capability identifier based on the operation information of terminal capability identifier comprises: adding the network identification information to networks to which the network-allocated terminal capability identifier is applicable; and
if the operation information of terminal capability identifier comprises: network identification information, and the network is a network to which a terminal capability identifier is not applicable, the performing the corresponding operation on the network-allocated terminal capability identifier based on the operation information of terminal capability identifier comprises: deleting the network identification information from networks to which the network-allocated terminal capability identifier is applicable.

14. The method according to claim 8, wherein
if the operation information of terminal capability identifier comprises a terminal capability identifier requested to be deleted or suspended, the performing a second operation related to terminal capability identifier based on the operation information of terminal capability identifier comprises: deleting or suspending the terminal capability identifier that is indicated by the operation information of terminal capability identifier;
if the operation information of terminal capability identifier comprises first indication information, the performing a second operation related to terminal capability identifier based on the operation information of terminal capability identifier comprises: changing the first-type terminal capability identifier in a terminal context to the second-type terminal capability identifier; and
if the operation information of terminal capability identifier comprises second indication information, the performing a second operation related to terminal capability identifier based on the operation information of terminal capability identifier comprises: transmitting the second-type terminal capability identifier when a terminal capability identifier needs to be transmitted.

15. The method according to claim 8, wherein
after the receiving operation information of terminal capability identifier, the following is further comprised:
receiving restoring operation information of terminal capability identifier, wherein the restoring operation information of terminal capability identifier is used for restoring a suspended terminal capability identifier; and
the restoring operation information of terminal capability identifier comprises at least one of the following: indication information indicating restoring a terminal capability identifier or a terminal capability identifier requested to be restored.

16. The method according to claim 8, wherein
before the receiving operation information of terminal capability identifier, the following is further comprised:
receiving request information, wherein the request information comprises at least one of the following: type information of terminal capability identifier, first request information, request information for a terminal-manufacturer-related terminal capability identifier, or enquiry information about whether a terminal-manufacturer-related terminal capability identifier is present; wherein the type information of terminal capability identifier is used for obtaining a terminal capability identifier conforming to the type information; and the first request information is used to request all types of terminal capability identifiers, and the terminal capability identifier is a terminal capability identifier mapped to a current capability of the terminal; and transmitting related information of terminal capability identifier based on the request information.

17. The method according to claim 16, wherein
the terminal capability identifier is a terminal capability identifier mapped to a current capability of the terminal; and
the current capability of the terminal is a terminal capability set of the terminal in a first network.

18. The method according to claim 16, wherein
if the request information comprises type information of terminal capability identifier,
the related information of terminal capability identifier comprises: a terminal capability identifier conforming to the type information;
and/or,
if the request information comprises request information for the terminal-manufacturer-related terminal capability identifier;
the related information of terminal capability identifier comprises at least one of the following: the terminal-manufacturer-related terminal capability identifier, indication information that the terminal-manufacturer-related terminal capability identifier is present, or indication information that no terminal-manufacturer-related terminal capability identifier is present;
and/or,
if the request information comprises enquiry information about whether the terminal-manufacturer-related terminal capability identifier is present;
the related information of terminal capability identifier comprises: indication information that the terminal-manufacturer-related terminal capability identifier is present, or indication information that no terminal-manufacturer-related terminal capability identifier is present;
and/or,
if the request information comprises first request information;
the related information of terminal capability identifier comprises: all types of terminal capability identifiers corresponding to the current capability of the terminal.

19. A communications device, comprising a processor, a memory, and a computer program stored in the memory and capable of running on the processor, wherein when the computer program is executed by the processor, a terminal capability identifier operation method is implemented and the method comprises:
receiving operation information of terminal capability identifier, wherein the operation information of terminal capability identifier comprises at least one of the following:
indication information indicating a terminal to delete or suspend a network-allocated terminal capability identifier;
a terminal capability identifier requested to be deleted or suspended;
first indication information, wherein the first indication information indicates changing a first-type terminal capability identifier in a terminal context to a second-type terminal capability identifier;
second indication information, wherein the second indication information indicates transmitting a second-type terminal capability identifier when a terminal capability identifier needs to be transmitted;
network identification information, wherein the network is an updated network to which a terminal capability identifier is applicable;
network identification information, wherein the network is a newly-added network to which a terminal capability identifier is applicable; or
network identification information, wherein the network is a network to which a terminal capability identifier is not applicable; and
performing a second operation related to terminal capability identifier based on the operation information of terminal capability identifier;
wherein the first-type terminal capability identifier is the network-allocated terminal capability identifier and the second-type terminal capability identifier is a terminal-manufacturer-related terminal capability identifier.

* * * * *